(12) United States Patent
Kato et al.

(10) Patent No.: US 10,834,734 B2
(45) Date of Patent: *Nov. 10, 2020

(54) TERMINAL APPARATUS AND INTEGRATED CIRCUIT

(71) Applicant: SHARP KABUSHIKI KAISHA, Sakai (JP)

(72) Inventors: Yasuyuki Kato, Sakai (JP); Katsunari Uemura, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,105

(22) Filed: Nov. 5, 2018

(65) Prior Publication Data

US 2019/0075572 A1 Mar. 7, 2019

Related U.S. Application Data

(63) Continuation of application No. 15/110,561, filed as application No. PCT/JP2014/083597 on Dec. 18, 2014, now Pat. No. 10,159,083.

(30) Foreign Application Priority Data

Jan. 24, 2014 (JP) ................. 2014-010856

(51) Int. Cl.
*H04W 48/12* (2009.01)
*H04W 72/10* (2009.01)
(Continued)

(52) U.S. Cl.
CPC ........... *H04W 72/10* (2013.01); *H04W 16/32* (2013.01); *H04W 48/12* (2013.01); *H04W 48/16* (2013.01); *H04W 76/15* (2018.02); *H04W 88/08* (2013.01)

(58) Field of Classification Search
CPC ..... H04W 72/10; H04W 16/32; H04W 48/12; H04W 28/0268
See application file for complete search history.

(56) References Cited

U.S. PATENT DOCUMENTS 9,635,705 B2 * 4/2017 Lu .................. H04W 60/00
10,159,083 B2 * 12/2018 Kato ............... H04W 16/32
(Continued)

FOREIGN PATENT DOCUMENTS

| JP | 2014-007499 A | 1/2014 |
| JP | 2014-150531 A | 8/2014 |
| WO | WO 2009/096195 A1 | 8/2009 |

OTHER PUBLICATIONS

3GPP TSG RAN WG2 Meeting #84, R2-134108, "RRC Signaling with Bearer Splitting Potential", San Francisco, USA, Nov. 11-15, 2013, pp. 1-5.
(Continued)

*Primary Examiner* — Wei Zhao
(74) *Attorney, Agent, or Firm* — Birch, Stewart, Kolasch & Birch, LLP

(57) ABSTRACT

A wireless communication system in which a first base station apparatus and a second base station apparatus communicate with a terminal apparatus. The first base station apparatus transmits, to the terminal apparatus, data control information related to data transmission and reception of the terminal apparatus and preferential base station apparatus information indicating a priority of data transmission to the base station apparatus, and the terminal apparatus determines any base station apparatus of the first base station apparatus and the second base station apparatus, as a data transmission destination base station apparatus, for data to which bearer split is configured by the data control information, based on at least one of the preferential base station
(Continued)

apparatus information and terminal information of the terminal apparatus.

2 Claims, 9 Drawing Sheets

(51) Int. Cl.
*H04W 48/16* (2009.01)
*H04W 16/32* (2009.01)
*H04W 76/15* (2018.01)
*H04W 88/08* (2009.01)

(56) References Cited

U.S. PATENT DOCUMENTS

| | | |
|---|---|---|
| 2010/0330995 A1 | 12/2010 | Aoyama et al. |
| 2014/0177560 A1 | 6/2014 | Guo |
| 2014/0211759 A1 | 7/2014 | Guo et al. |
| 2015/0146688 A1 | 5/2015 | Yasuda et al. |
| 2016/0242193 A1 | 8/2016 | Hong et al. |
| 2016/0255665 A1* | 9/2016 | Futaki .................. H04W 52/36 370/329 |

OTHER PUBLICATIONS

3GPP TR 36.842 V1.0.0, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", Nov. 2013.

3GPP TR 36.300 V11.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", (Sep. 2013).

Advisory Action issued in copending U.S. Appl. No. 15/110,561, dated May 25, 2018.

Alcatel-Lucent, "Discussion on the RRC protocol supporting dual connectivity", 3GPP TSG RAN WG2 Meeting #81 bis R2-131352, Chicago, USA; Apr. 15, 2013.

Alcatel-Lucent, "Signalling flows for dual connectivity architecture 1A," 3GPP TSG-RAN WG3 Meeting #82 R3-132168, San Francisco, USA; Nov. 11, 2013.

BlackBerry UK Limited, "Considerations of Small Cell RRC Message Transmission", 3GPP TSG RAN WG2 Meeting #83 R2-132441; Barcelona, Spain; Aug. 19, 2013.

CATT, "Discussion on Xn interace between MeNB and SeNB", 3GPP TSG RAN WG3#81 R3-131221, Barcelona, Spain; Aug. 19, 2017.

Final Office Action issued in copending U.S. Appl. No. 15/110,561, dated Feb. 12, 2018.

Fujitsu, "Control of Usage of Radio Resources in Inter-node Radio Resource Aggregation", 3GPP TSG-RAN WG2 Meeting #83bis R2-13398; Ljubljana, Slovenia; Oct. 7, 2013.

Non-Final Office Action issued in copending U.S. Appl. No. 15/110,561, dated Sep. 22, 2017.

Notice of Allowance issued in copending U.S. Appl. No. 15/110,561, dated Aug. 13, 2018.

3GPP TSG-RAN WG2#81, R2-130488, Necessity of C-plane architecture enhancements for dual connectivity; Feb. 1, 2013.

\* cited by examiner

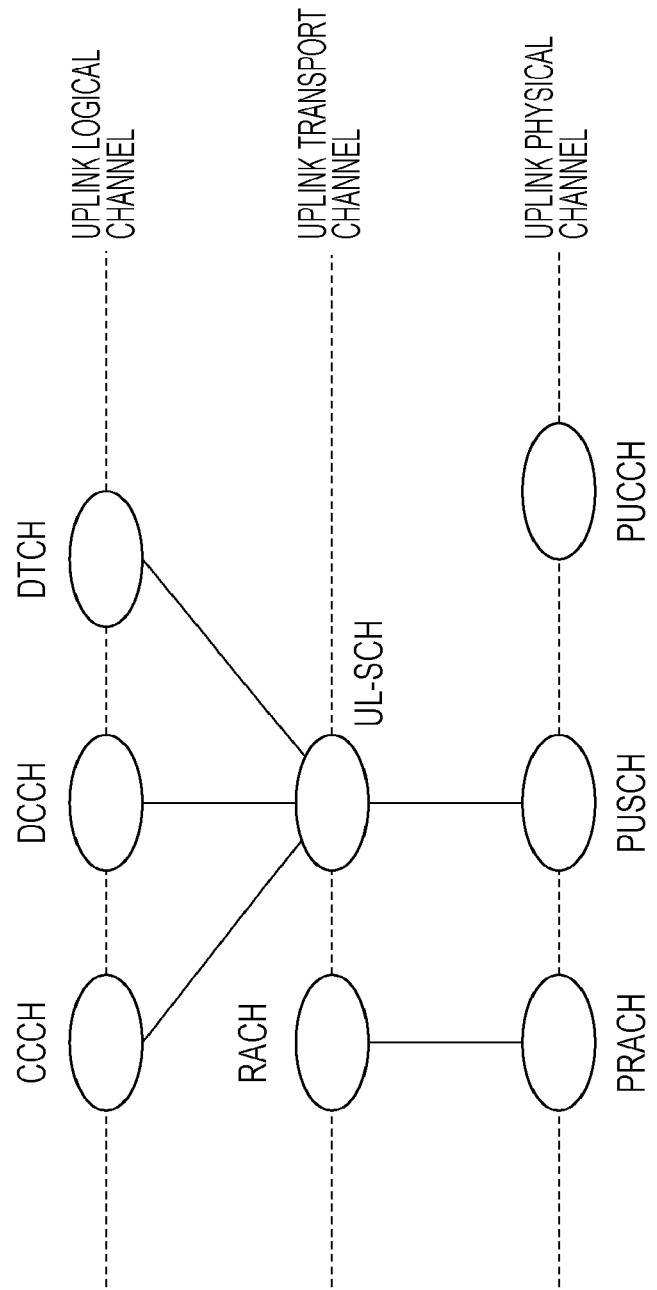

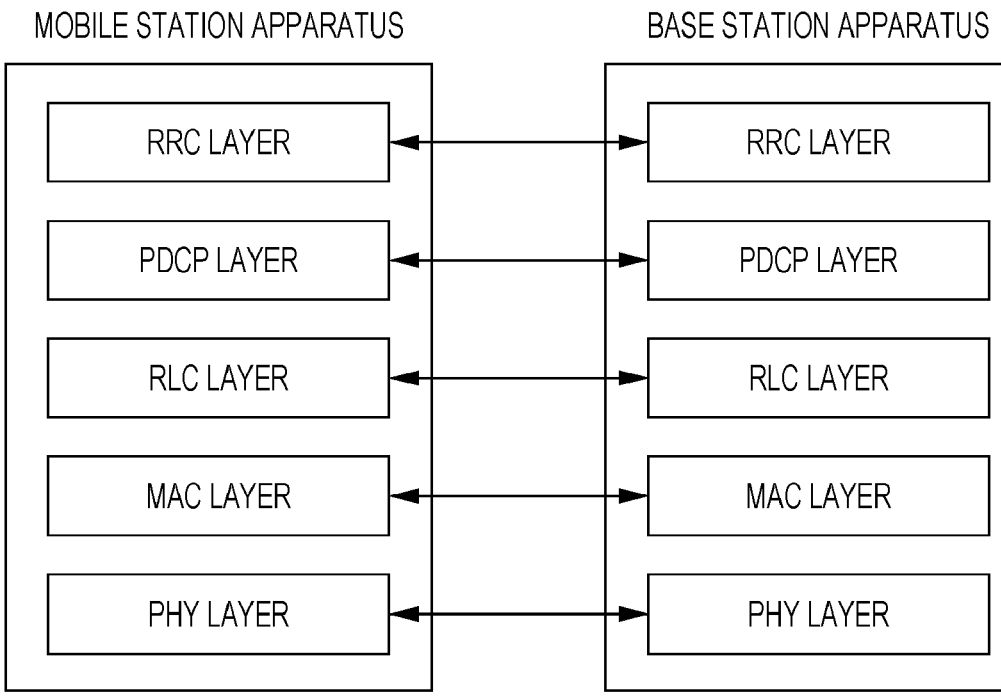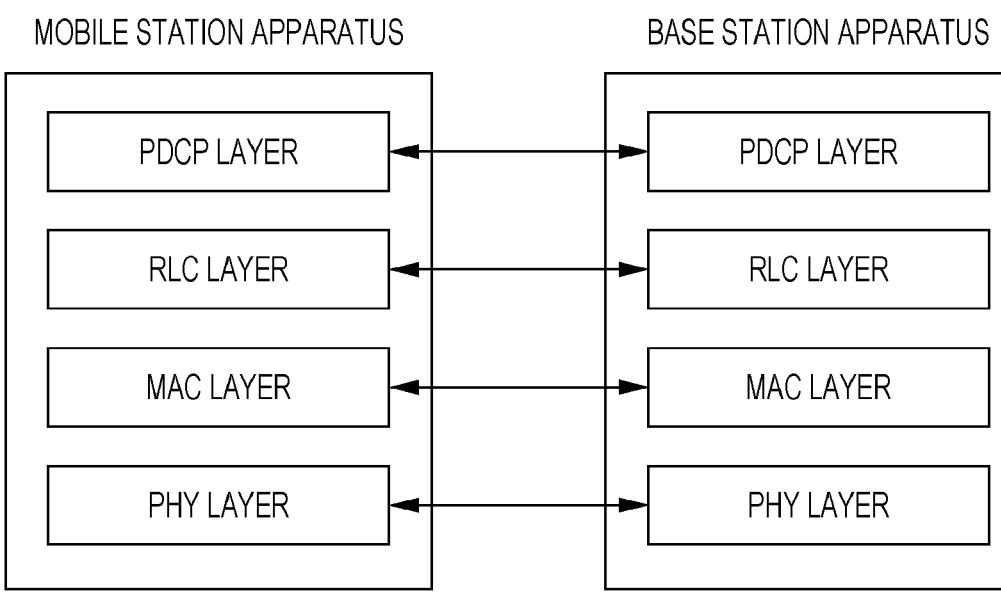

TERMINAL APPARATUS AND INTEGRATED CIRCUIT

CROSS-REFERENCE TO RELATED APPLICATIONS

This application is a Continuation of copending application Ser. No. 15/110,561, filed on Jul. 8, 2016, which is the National Phase under 35 U.S.C. § 371 of International Application No. PCT/JP2014/083597, filed on Dec. 18, 2014, which claims the benefit under 35 U.S.C. § 119(a) to Patent Application No. 2014-010856, filed in Japan on Jan. 24, 2014, all of which are hereby expressly incorporated by reference into the present application.

TECHNICAL FIELD

The present invention relates to a wireless communication system, a base station apparatus, and a terminal apparatus, and more specifically, to a wireless communication system, a base station apparatus, a terminal apparatus, a wireless communication method, and an integrated circuit which are related to data control.

The present disclosure contains subject matter related to that disclosed in Japanese Priority Patent Application JP 2014-010856 filed in the Japan Patent Office on Jan. 24, 2014, the entire contents of which are hereby incorporated by reference.

BACKGROUND ART

In the 3rd Generation Partnership Project (3GPP), a W-CDMA system has been standardized as a 3rd generation cellular mobile communication system and services have been launched. HSDPA having a higher communication speed has been also standardized, and services have been launched.

Meanwhile, in the 3GPP, an evolved 3rd radio access (Evolved Universal Terrestrial Radio Access: hereinafter, referred to as "EUTRA") technology has been standardized, and services have been launched. As a downlink communication method of the EUTRA, an orthogonal frequency division multiplexing (OFDM) scheme which has high resistance to multipath interference and is appropriate for high-speed transmission has been employed. As an uplink communication method, there has been employed a discrete Fourier transform (DFT)-spread OFDM scheme of single carrier-frequency division multiple access (SC-FDMA) that can reduce the peak-to-average power ratio (PAPR) of a transmission signal in consideration of cost and power consumption of mobile station apparatuses.

In the 3GPP, discussion on the Advanced-EUTRA which is further evolution of the EUTRA technology has been started. In the Advanced-EUTRA, it is assumed that communication is performed at a maximum transmission rate of 1 Gbps or more in a downlink and at a transmission rate of 500 Mbps or more in an uplink by using a band up to a maximum bandwidth of 100 MHz in the uplink and the downlink.

In the Advanced-EUTRA, it is considered that a maximum bandwidth of 100 MHz is achieved by binding a plurality of bands compatible with the EUTRA such that a mobile station apparatus of the EUTRA can be accommodated. In the Advanced-EUTRA, one band of 20 MHz or less in the EUTRA is called a component carrier (CC). The component carrier is also called a cell. The binding of the bands of 20 MHz or less is called carrier aggregation (CA) (NPL 1).

In the Advanced-EUTRA, it has been examined that the carrier aggregation of a macrocell and a small cell present in the coverage of the macrocell is performed within a frequency or between frequencies. A case where the small cell is present in the coverage of the macrocell may include a case where frequencies are different. NPL 2 discloses that in the communication between the base station apparatus and the mobile station apparatus at the time of the carrier aggregation of the macrocell and the small cell, the macrocell transmits control information (control-plane information) and the small cell transmits user information (user-plane information). The carrier aggregation of the macrocell and the small cell disclosed in NPL 2 is called dual connect (or dual connectivity).

In the dual connect, it is considered that information on the same radio bearer (RB) is transmitted to the mobile station apparatus from the base station apparatus as the macrocell and the base station apparatus as the small cell and the information on the same radio bearer (RB) is transmitted to the base station apparatus as the macrocell and the base station apparatus as the small cell from the mobile station apparatus. Control performed such that the base station apparatus and the mobile station apparatus transmit and receive the information on the same radio bearer through different base station apparatuses is called bearer split.

CITATION LIST

Non Patent Literature

NPL 1: 3GPP TS (Technical Specification) 36.300, V11.7.0 (2013-09), Evolved Universal Terrestrial Radio Access (E-UTRA) and Evolved Universal Terrestrial Radio Access Network (E-UTRA) and Evolved Universal Terrestrial Radio Access Network (E-UTRAN), Overall description Stage 2

NPL 2: 3GPP TR (Technical Report) 36.842, V1.0.0 (2013-11), Study on Small Cell Enhancements for E-UTRA and E-UTRAN-Higher layer aspects (release 12)

SUMMARY OF INVENTION

Technical Problem

However, in the communication between the base station apparatus and the mobile station apparatus disclosed in NPL 2, in a case where data is transmitted and received by performing the bearer split between the base station apparatus as the macrocell and the base station apparatus as the small cell and the mobile station apparatus, if control is not performed such that an appropriate cell is selected and the selected cell transmits and receives the data, data throughput may be degraded.

Particularly, in a case where the bearer split is performed on uplink data from the mobile station apparatus to the base station apparatus as the macrocell and the base station apparatus as the small cell, it is necessary to appropriately select a cell to which the mobile station apparatus transmits the data.

The present invention has been made in view of such circumstances, and it is an object of the present invention to provide a wireless communication system, a base station apparatus, a mobile station apparatus, a wireless communication method, and an integrated circuit, which allow a mobile station apparatus to efficiently perform a data transmission process at the time of bearer split in dual connect.

Solution to Problem (1) In order to achieve the aforementioned object, an aspect of the present invention provides the following means. That is, according to an aspect of the present invention, there is provided a wireless communication system in which a first base station apparatus and a second base station apparatus communicate with a terminal apparatus. The first base station apparatus transmits, to the terminal apparatus, data control information related to data transmission and reception of the terminal apparatus and preferential base station apparatus information indicating a priority of data transmission to the base station apparatus, and the terminal apparatus determines any base station apparatus of the first base station apparatus and the second base station apparatus, as a data transmission destination base station apparatus, for data to which bearer split is configured by the data control information, based on at least one of the preferential base station apparatus information and terminal information of the terminal apparatus.

(2) In the wireless communication system according to (1), the terminal information may be radio channel quality information and/or a transmission buffer quantity of the terminal apparatus.

(3) According to another aspect of the present invention, there is provided a wireless communication system in which a first base station apparatus and a second base station apparatus communicate with a terminal apparatus. The first base station apparatus transmits data control information related to data transmission and reception of the terminal apparatus to the terminal apparatus by using an RRC message, the first base station apparatus or the second base station apparatus transmits transmission destination base station apparatus information indicating any one base station apparatus of the first base station apparatus and the second base station apparatus as a base station apparatus which is a data transmission destination to the terminal apparatus by using a MAC message, and the terminal apparatus determines any base station apparatus of the first base station apparatus and the second base station apparatus, as a data transmission destination base station apparatus, depending on the transmission destination base station apparatus information, for data to which bearer split is configured by the data control information, in a case where the transmission destination base station apparatus information is received.

(4) In the wireless communication system according to (3), the first base station apparatus or the second base station apparatus may compare base station apparatus information items of the first base station apparatus and the second base station apparatus, and may determine the transmission destination base station apparatus information.

(5) According to still another aspect of the present invention, there is provided a terminal apparatus that communicates with a first base station apparatus and a second base station apparatus. The terminal apparatus is adapted to: receive, from the first base station apparatus, data control information related to data transmission and reception of the terminal apparatus and preferential base station apparatus information indicating a priority of data transmission to the base station apparatus; and determine any base station apparatus of the first base station apparatus and the second base station apparatus, as a data transmission destination base station apparatus, for data to which bearer split is configured by the data control information, based on at least one of the preferential base station apparatus information and terminal information of the terminal apparatus.

(6) In the terminal apparatus according to (5), the terminal information may be radio channel quality information and/or a transmission buffer quantity of the terminal apparatus.

(7) According to still another aspect of the present invention, there is provided a terminal apparatus that communicates with a first base station apparatus and a second base station apparatus. The terminal apparatus is adapted to: receive, from the first base station apparatus, an RRC message including data control information related to data transmission and reception of the terminal apparatus; receive, from the first base station apparatus or the second base station apparatus, a MAC message including transmission destination base station apparatus information indicating any one base station apparatus of the first base station apparatus and the second base station apparatus as a base station apparatus which is a data transmission destination; and determine any base station apparatus of the first base station apparatus and the second base station apparatus, as a data transmission destination base station apparatus, for data to which bearer split is configured by the data control information, depending on the transmission destination base station apparatus information, in a case where the transmission destination base station apparatus information is received.

(8) According to still another aspect of the present invention, there is provided a base station apparatus that is connected to another base station apparatus, and communicates with a terminal apparatus. The base station apparatus is adapted to: transmit, to the terminal apparatus, data control information related to data transmission and reception of the terminal apparatus and preferential base station apparatus information indicating a priority of data transmission to the base station apparatus.

(9) According to still another aspect of the present invention, there is provided a base station apparatus that is connected to another base station apparatus, and communicates with a terminal apparatus. The base station apparatus is adapted to: transmit data control information related to data transmission and reception of the terminal apparatus to the terminal apparatus by using an RRC message; transmit transmission destination base station apparatus information indicating any one of the base station apparatus and the other base station apparatus as a base station apparatus which is a data transmission destination to the terminal apparatus by using a MAC message; and transmit uplink transmission permission information of the base station apparatus to the terminal apparatus.

(10) In the base station apparatus according to (9), the base station apparatus may be adapted to receive base station apparatus information of the other base station apparatus from the other base station apparatus, may compare the base station apparatus information items of the other base station apparatus and the base station apparatus, and may determine transmission destination base station apparatus information.

(11) According to still another aspect of the present invention, there is provided a wireless communication method that is applied to a wireless communication system in which a first base station apparatus and a second base station apparatus communicate with a terminal apparatus. The method includes: a step of causing the first base station apparatus to transmit, to the terminal apparatus, data control information related to data transmission and reception of the terminal apparatus and preferential base station apparatus information indicating a priority of data transmission to the base station apparatus; and a step of causing the terminal apparatus to determine any base station apparatus of the first base station apparatus and the second base station apparatus, as a data transmission destination base station apparatus, for data to which bearer split is configured by the data control information, based on at least one of the preferential base station apparatus information and terminal information of the terminal apparatus.

(12) According to still another aspect of the present invention, there is provided a wireless communication method that is applied to a wireless communication system in which a first base station apparatus and a second base station apparatus communicate with a terminal apparatus. The method includes: a step of causing the first base station apparatus to transmit data control information related to data transmission and reception of the terminal apparatus to the terminal apparatus by using an RRC message; a step of causing the first base station apparatus or the second base station apparatus to transmit transmission destination base station apparatus information indicating any one base station apparatus of the first base station apparatus and the second base station apparatus as a base station apparatus which is a data transmission destination to the terminal apparatus by using a MAC message; and a step of causing the terminal apparatus to determine any base station apparatus of the first base station apparatus and the second base station apparatus, as a data transmission destination base station apparatus, depending on the transmission destination base station apparatus information, for data to which bearer split is configured by the data control information, in a case where the transmission destination base station apparatus information is received.

(13) According to still another aspect of the present invention, there is provided an integrated circuit that is applied to a base station apparatus which is connected to another base station apparatus and communicates with a terminal apparatus. The integrated circuit includes: means for transmitting data control information related to data transmission and reception of the terminal apparatus to the terminal apparatus by using an RRC message; means for transmitting transmission destination base station apparatus information indicating any one of the base station apparatus and the other base station apparatus as a base station apparatus which is a data transmission destination to the terminal apparatus by using a MAC message; and means for transmitting uplink transmission permission information of the base station apparatus to the terminal apparatus.

(14) According to still another aspect of the present invention, there is provided an integrated circuit that is applied to a terminal apparatus which communicates with a first base station apparatus and a second base station apparatus. The integrated circuit includes: means for receiving, from the first base station apparatus, data control information related to data transmission and reception of the terminal apparatus and preferential base station apparatus information indicating a priority of data transmission to the base station apparatus; and means for determining any base station apparatus of the first base station apparatus and the second base station apparatus, as a data transmission destination base station apparatus, for data to which bearer split is configured by the data control information, based on at least one of the preferential base station apparatus information and terminal information of the terminal apparatus.

Advantageous Effects of Invention

According to the aspect of the present invention, a mobile station apparatus can perform efficient data transmission to a base station apparatus as a macrocell or a base station apparatus as a small cell.

BRIEF DESCRIPTION OF DRAWINGS

FIG. 6 is a diagram showing an example of a structure of an uplink channel in the EUTRA.

FIG. 7 is a diagram showing an example of a structure of a communication protocol related to control information items of the base station apparatus and the mobile station apparatus.

FIG. 8 is a diagram showing an example of a structure of a communication protocol related to user information items of the base station apparatus and the mobile station apparatus.

DESCRIPTION OF EMBODIMENTS

An OFDM scheme is adopted as a downlink of EUTRA. A single carrier communication method of a DFT-spread OFDM scheme is adopted as an uplink of the EUTRA.

Figure 4:
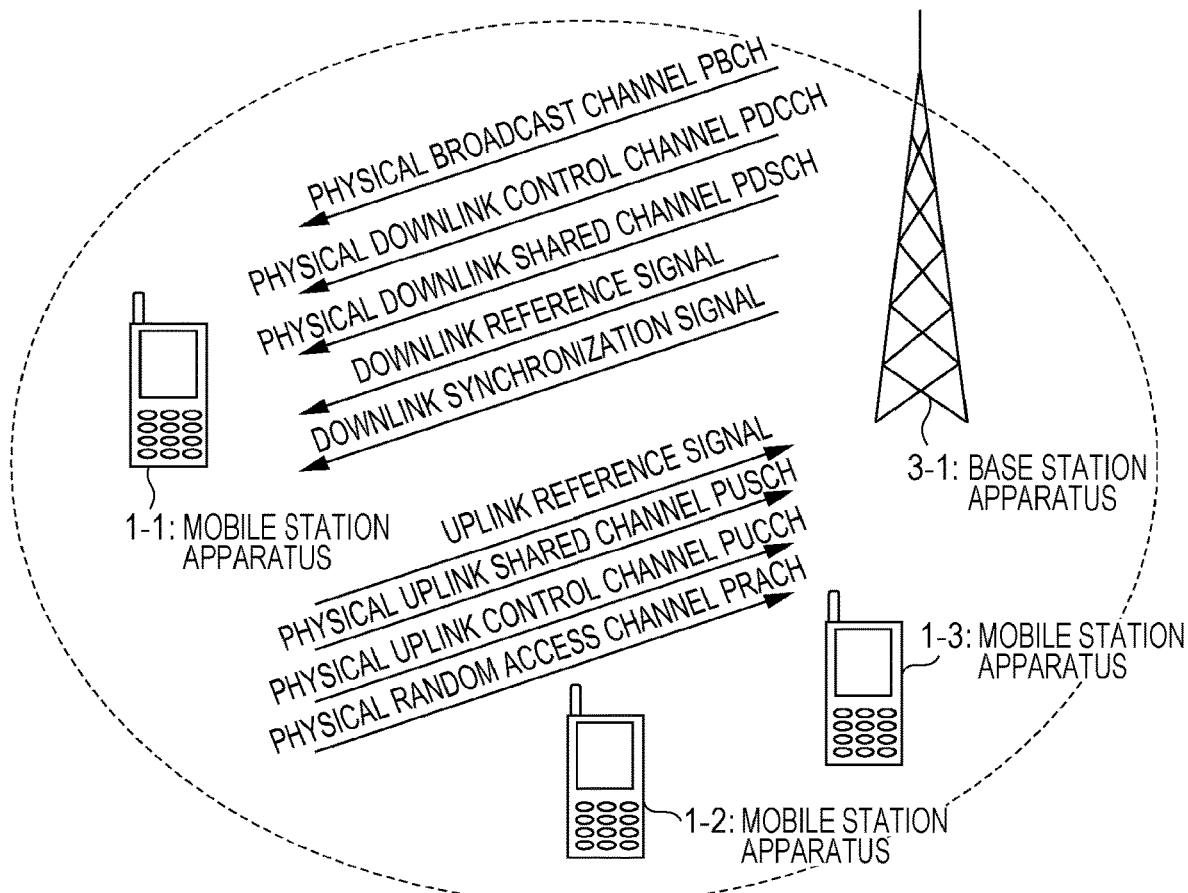
FIG. 4 is a diagram showing an example of a structure of a physical channel in EUTRA.

FIG. 4 is a diagram showing a structure of a physical channel of the EUTRA. A downlink physical channel includes a physical downlink shared channel PDSCH, a physical downlink control channel PDCCH, and a physical broadcast channel PBCH. In addition, there are physical signals such as a downlink synchronization signal and a downlink reference signal (NPL 1).

An uplink physical channel includes a physical random access channel PRACH, a physical uplink shared channel PUSCH, and a physical uplink control channel PUCCH. In addition, there is a physical signal such as an uplink reference signal (NPL 1).

Figure 5:
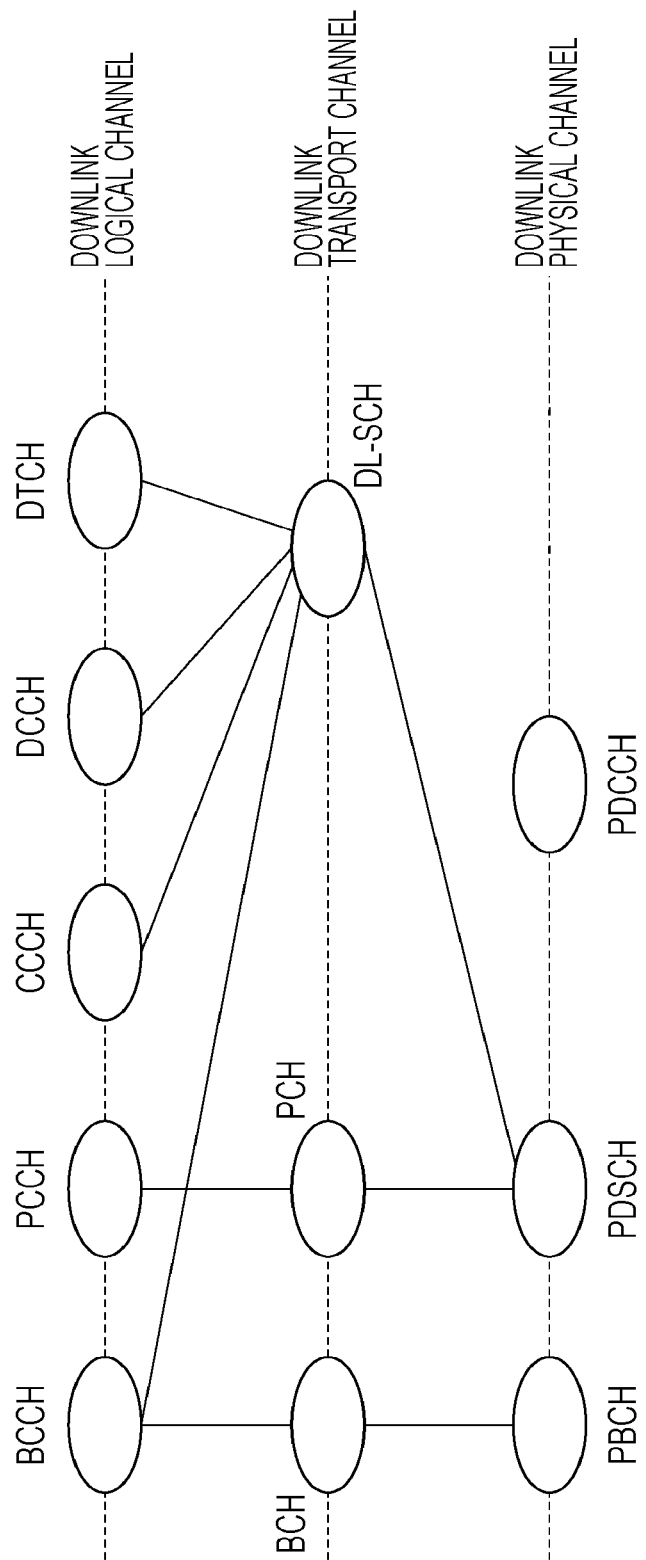
FIG. 5 is a diagram showing an example of a structure of a downlink channel in the EUTRA.

FIG. 5 is a diagram showing a structure of a downlink channel of the EUTRA. The downlink channel shown in FIG. 5 includes a logical channel, a transport channel, and a physical channel. The logical channel defines kinds of data transport services transmitted and received in a medium access control (MAC) layer. The transport channel defines the characteristic of data transmitted by a wireless interface and how to transmit the data. The physical channel is a physical channel on which data transferred to the physical layer by the transport channel is delivered.

The downlink logical channel includes a broadcast control channel BCCH, a paging control channel PCCH, a common control channel CCCH, a dedicated control channel DCCH, and a dedicated traffic channel DTCH.

The downlink transport channel includes a broadcast channel BCH, a paging channel PCH, and a downlink shared channel DL-SCH.

The downlink physical channel includes a physical broadcast channel PBCH, a physical downlink control channel PDCCH, and a physical downlink shared channel PDSCH. These channels are transmitted and received between a base station apparatus and a mobile station apparatus.

Hereinafter, the logical channel will be described. The broadcast control channel BCCH is a downlink channel used for broadcasting system control information. The paging control channel PCCH is a downlink channel for transmitting paging information, and is used when a network does not know a cell position of the mobile station apparatus. The common control channel CCCH is a channel used for transmitting control information between the mobile station apparatus and the network, and is used by the mobile station apparatus which does not establish radio resource control (RRC) connection with the network.

The dedicated control channel DCCH is a point-to-point bidirectional channel, and is a channel used for transmitting individual control information between the mobile station apparatus and the network. The dedicated control channel DCCH is used by the mobile station apparatus which establishes the RRC connection. The dedicated traffic channel DTCH is a point-to-point bidirectional channel, is a dedicated channel for one mobile station apparatus, and is used for transmitting user information (unicast data).

Hereinafter, the transport channel will be described. The broadcast channel BCH is broadcasted to all cells in a transmission format which is fixed or is defined in advance. The downlink shared channel DL-SCH supports hybrid automatic repeat request (HARQ), dynamic adaptation radio link control and discontinuous reception (DRX), and needs to be broadcasted to all the cells.

The paging channel PCH supports the DRX, and needs to be broadcasted to all the cells. The paging channel PCH is mapped to a physical resource dynamically used for the traffic channel or another control channel, that is, the physical downlink shared channel PDSCH.

Hereinafter, the physical channel will be described. The physical broadcast channel PBCH maps to the broadcast channel BCH at intervals of 40 milliseconds. The physical downlink control channel PDCCH is a channel used for notifying the mobile station apparatus of a certain uplink transmission permission (uplink grant) in resource assignment of the downlink shared channel PDSCH, hybrid automatic repeat request (HARQ) information for downlink data, and resource assignment of the physical uplink shared channel PUSCH. The physical downlink shared channel PDSCH is a channel used for transmitting the downlink data or the paging information.

Hereinafter, the channel mapping will be described. As shown in FIG. 5, in the downlink, the mapping of the transport channel and the physical channel is performed as follows. The broadcast channel BCH is mapped to the physical broadcast channel PBCH. The paging channel PCH and the downlink shared channel DL-SCH are mapped to the physical downlink shared channel PDSCH. The physical downlink control channel PDCCH is independently used as the physical channel.

In the downlink, the mapping of the logical channel and the transport channel is performed as follows. The paging control channel PCCH is mapped to the paging channel PCH. The broadcast control channel BCCH is mapped to the broadcast channel BCH and the downlink shared channel DL-SCH. The common control channel CCCH, the dedicated control channel DCCH and the dedicated traffic channel DTCH are mapped to the downlink shared channel DL-SCH.

FIG. 6 is a diagram showing a structure of an uplink channel of the EUTRA. The uplink channel shown in FIG. 6 includes a logical channel, a transport channel and a physical channel. The definition of the respective channels is the same as that of the downlink channels.

The uplink logical channel includes a common control channel CCCH, a dedicated control channel DCCH, and a dedicated traffic channel DTCH.

The uplink transport channel includes an uplink shared channel UL-SCH, and a random access channel RACH.

The uplink physical channel includes a physical uplink control channel PUCCH, a physical uplink shared channel PUSCH, and a physical random access channel PRACH. These channels are transmitted and received between the base station apparatus and the mobile station apparatus. The physical random access channel PRACH is mainly used for transmitting a random access preamble for acquiring transmission timing information from the mobile station apparatus to the base station apparatus. The random access preamble is transmitted during a random access procedure.

Hereinafter, the logical channel will be described. The common control channel CCCH is a channel used for transmitting control information between the mobile station apparatus and the network, and is used by the mobile station apparatus which does not establish radio resource control (RRC) connection with the network.

The dedicated control channel DCCH is a point-to-point bidirectional channel, and is a channel used for transmitting individual control information between the mobile station apparatus and the network. The dedicated control channel DCCH is used by the mobile station apparatus which establishes the RRC connection. The dedicated traffic channel DTCH is a point-to-point bidirectional channel, is a dedicated channel for one mobile station apparatus, and is used for transmitting user information (unicast data).

Hereinafter, the transport channel will be described. The uplink shared channel UL-SCH supports hybrid automatic repeat request (HARQ), dynamic adaptation radio link control and discontinuous transmission (DTX). On the random access channel RACH, restricted control information is transmitted.

Hereinafter, the physical channel will be described. The physical uplink control channel PUCCH is a channel used for notifying the base station apparatus of response information (ACK or NACK) to the downlink data, radio channel quality information of the downlink and a transmission request (scheduling request: SR) of uplink data. The physical uplink shared channel PUSCH is a channel used for transmitting the uplink data. The physical random access channel is a channel used for transmitting the random access preamble.

Hereinafter, the channel mapping will be described. In the uplink, the mapping of the transport channel and the physical channel is performed as shown in FIG. 6. The uplink shared channel UL-SCH is mapped to the physical uplink shared channel PUSCH. The random access channel RACH is mapped to the physical random access channel PRACH. The physical uplink control channel PUCCH is a physical channel having no mapped transport channel.

In the uplink, the mapping of the logical channel and the transport channel is performed as follows. The common control channel CCCH, the dedicated control channel DCCH and the dedicated traffic channel DTCH are mapped to the uplink shared channel UL-SCH.

FIG. 7 is a protocol stack which deals control data of the mobile station apparatus and the base station apparatus of the EUTRA. FIG. 8 is a protocol stack which deals user data of the mobile station apparatus and the base station apparatus of the EUTRA. The protocol stacks will be described below with reference to FIGS. 7 and 8.

A physical layer (PHY layer) provides a transport service to a higher layer by using the physical channel. The PHY layer is connected to a higher medium access control layer (MAC layer) on the transport channel. Data is moved between the layers of the MAC layer and the PHY layer through the transport channel. Data is transmitted and received between the PHY layers of the mobile station apparatus and the base station apparatus through the physical channel.

The MAC layer maps various logical channels to various transport channels. The MAC layer is connected to a higher radio link control layer (RLC layer) on a logical channel. The logical channel is greatly divided according to the kind of information to be transported, and is divided into a control channel on which control information is transported and a traffic channel on which user information is transported. The MAC layer has a function of controlling the PHY layer in order to perform discontinuous reception and discontinuous transmission (DRX and DTX), a function of performing the random access procedure, a function of notifying transmit power information, and a function of performing HARQ control.

The RLC layer performs segmentation and concatenation on data received from a higher layer, and adjusts a data service such that a lower layer can appropriately transmit data. The RLC layer has a function of guaranteeing quality of service (QoS) requested by each data. That is, the RLC layer has a function of controlling data retransmission.

A packet data convergence protocol layer (PDCP layer) has a header compression function of compressing the control information in order to efficiently transport an IP packet which is the user data in a radio section. The PDCP layer has a function of ciphering data.

The radio resource control layer (RRC layer) is defined for only the control information. The RRC layer configures and reconfigures a radio bearer (RB), and controls the logical channel, the transport channel and the physical channel. The RB is divided into a signaling radio bearer (SRB) and a data radio bearer (DRB). The SRB is used as a path on which an RRC message which is the control information is transmitted. The DRB is used as a path on which the user information is transmitted. Each RB is configured between the RRC layers of the base station apparatus and the mobile station apparatus.

The PHY layer corresponds to a physical layer as a first layer of a hierarchy of the open systems interconnection (OSI) model which is generally known, the MAC layer, the RLC layer and the PDCP layer correspond to a data link layer which is a second layer of the OSI model, and the RRC layer corresponds to a network layer which is a third layer of the OSI model.

The random access procedure will be described below. The random access procedure includes two access procedures of a contention based random access procedure and a non-contention based random access procedure (NPL 1).

The contention based random access procedure having a possibility that contention will occur between the mobile station apparatuses, and is performed by the scheduling request in a case where initial access is performed in a state in which connection (communication) with the base station apparatus is not performed or in a case where the connection with the base station apparatus is performed but uplink data is transmitted to the mobile station apparatus in a state in which uplink synchronization is incorrect.

The non-contention based random access procedure is a random access procedure in which contention does not occur between the mobile station apparatuses, and the mobile station apparatus starts the random access procedure in response to an instruction from the base station apparatus in a special case such as a case where a transmission timing of the mobile station apparatus is not valid or handover in order to rapidly achieve the uplink synchronization between the mobile station apparatus and the base station apparatus in a case where the base station apparatus and the mobile station apparatus are connected but the unlink synchronization is incorrect. The non-contention based random access procedure is performed in response to the control data of the physical downlink control channel PDCCH and a message of the radio resource control (RRC: Layer3) layer.

The contention based random access procedure will be simply described. Initially, a mobile station apparatus 1-1 transmits the random access preamble to a base station apparatus 3-1 (message 1: (1), step S1). The base station apparatus 3-1 that has received the random access preamble transmits a response (random access response) to the random access preamble to the mobile station apparatus 1-1 (message 2: (2), step S2). The mobile station apparatus 1-1 transmits a message of a higher layer (Layer2 or Layer3) based on scheduling information included in the random access preamble (message 3: (3), step S3). The base station apparatus 3-1 transmits a contention resolution message to the mobile station apparatus 1-1 that has received the higher layer message of (3) (message 4: (4), step S4). The contention based random access is referred to as random preamble transmission.

The non-contention based random access procedure will be simply described. Initially, the base station apparatus 3-1 notifies the mobile station apparatus 1-1 of a preamble number (or a sequence number) and a random access channel number to be used (message 0; (1)', step S11). The mobile station apparatus 1-1 transmits the random access preamble of the designated preamble number to the designated random access channel RACH (message 1: (2)', step S12). The base station apparatus 3-1 that has received the random access preamble transmits a response (random access response) to the random access preamble to the mobile station apparatus 1-1 (message 2: (3)', step S13). In a case where the value of the notified preamble number is 0, the contention based random access procedure is performed. The non-contention based random access procedure is referred to as dedicated preamble transmission.

The scheduling request (SR) will be described below. The physical uplink control channel PUCCH is used for transmitting a response (ACK or NACK) of the downlink data transmitted on the physical downlink shared channel PUSCH, radio channel quality information (channel quality indicator: CQI) of the downlink, and a transmission request (scheduling request) of the uplink data. In a case where the mobile station apparatus 1-1 performs the transmission request of the uplink data, the mobile station apparatus transmits the scheduling request to the base station apparatus 3-1 by using the physical uplink control channel PUCCH assigned by the base station apparatus 3-1.

After the scheduling request is transmitted, in a case where the physical uplink shared channel PUSCH is assigned by the base station apparatus 3-1, the mobile station apparatus 1-1 transmits buffer status report (BSR) indicating buffer status information of transmission data of the mobile station apparatus 1-1 on the assigned physical uplink shared channel PUSCH. The base station apparatus 3-1 performs uplink data scheduling on the mobile station apparatus 1-1 based on the buffer status report.

After the scheduling request is transmitted, in a case where the physical uplink shared channel PUSCH is not assigned by the base station apparatus 3-1, the mobile station apparatus 1-1 retransmits the scheduling request. In a case where the physical uplink shared channel PUSCH is not assigned by the base station apparatus 3-1 even though the retransmission of the scheduling request is repeated, the mobile station apparatus 1-1 releases the assigned physical uplink control channel PUCCH and the uplink reference signal, and performs the random access procedure for performing the scheduling request. In the scheduling request performed by the random access procedure, the mobile station apparatus 1-1 transmits the buffer status response in the transmission of the message 3.

Hereinafter, the function of the MAC layer of the mobile station apparatus will be described in more detail. The MAC layer has a function of mapping the respective logical channels to the transport channel. This procedure is referred to as a logical channel prioritization (LCP) procedure. A basic LCP procedure determines a transmission priority level of the transmission data in consideration of a priority of each logical channel and a transmission bit rate (prioritized bit rate: PBR) at which the transmission data needs to be transmitted within a given period of time corresponding to the QoS of the radio bearer, and maps data to the transport channel in descending order of the transmission priority level at a point of time when the uplink grant is received. The MAC layer when the connection with the base station apparatus is performed acquires information such as a logical channel number of each RB, the priority of the logical channel and PBR from the RRC layer.

The MAC layer has a function of notifying of the data amount of a transmission buffer corresponding to each logical channel. This function is referred to as buffer status report (BSR). In the BSR, the respective logical channels are assigned to a logical channel group (LCG), and transmission buffer volumes of the respective LCGs are notified to the base station apparatus, as a message of the MAC layer.

As a condition in which the BSR is triggered, there are several conditions. For example, when data capable of being transmitted is generated and this data has a priority of the logical channel is higher than that data present in the transmission buffer, the trigger condition of the BSR is satisfied. When one periodical timer expires, the trigger condition of the BSR is satisfied. The BSR includes Short BSR for reporting a buffer status of one logical channel group and Long BSR for reporting a buffer status of a plurality of logical channel groups.

In a case where radio resource (physical uplink shared channel PUSCH) for notifying the BSR in a case where the trigger condition of the BSR is satisfied is not assigned, the MAC layer instructs the PHY layer to transmit the scheduling request (SR). After the radio resource is assigned, the MAC layer transmits the BSR. In a case where the instruction to transmit the scheduling request is received from the MAC layer, the PHY layer transmits the scheduling request by using the physical uplink control channel PUCCH. In a case where the physical uplink control channel PUCCH for transmitting the scheduling request is not assigned (is not valid), the MAC layer instructs the PHY layer to perform the scheduling request using the physical random access channel PRACH.

In the 3GPP, Advanced-EUTRA which is further evolution of the EUTRA has been discussed. In the Advanced-EUTRA, it is assumed that communication is performed at a maximum transmission rate of 1 Gbps or more in the downlink and at a transmission rate of 500 Mbps or more in the uplink by using a band up to a maximum bandwidth of 100 MHz in the uplink and the downlink.

In the Advanced-EUTRA, it is considered that a maximum bandwidth of 100 MHz is achieved by binding a plurality of bands of 20 MHz or less in the EUTRA such that the mobile station apparatus of the EUTRA can be accommodated. In the Advanced-EUTRA, one band of 20 MHz or less in the EUTRA is called a component carrier (CC). One cell is constituted by binding one downlink component carrier and one uplink component carrier. One cell may be constructed by only one downlink component carrier.

The base station apparatus assigns a plurality of cells satisfying the communication capability and communication condition of the mobile station apparatus, and communicates with the mobile station apparatus through the plurality of assigned cells. Among the plurality of cells assigned to the mobile station apparatus, one cell is classified as a first cell (primary cell: PCell), and other cells are classified as second cells (secondary cell: SCell). A special function such as the assignment of the physical uplink control channel PUCCH is configured for the first cell.

In order to reduce the power consumption of the mobile station apparatus, the mobile station apparatus does not perform a downlink reception process on the immediately assigned second cells (or does not follow radio resource assignment information indicated by the physical downlink control channel PDCCH). After the instruction to activate the second cells (or the activation instruction) is received from the base station apparatus, the mobile station apparatus starts the downlink reception process on the second cells to be activated as instructed (or follows the radio resource assignment information indicated by the physical downlink control channel PDCCH).

After the instruction to deactivate the activated second cells is received from the base station apparatus, the mobile station apparatus stops the downlink reception process on the second cells to be deactivated (or to be subject to the deactivation) as instructed (or does not follow the radio resource assignment information indicated by the physical downlink control channel PDCCH). The second cells which are activated as instructed by the base station apparatus and on which the downlink reception process is performed are referred to as activated cells, and the second cells immediately assigned to the mobile station apparatus from the base station apparatus and the second cells which are deactivated as instructed and on which the downlink reception process is stopped are referred to as deactivated cells. The first cell is constantly an activated cell.

In a case where carrier aggregation is performed, the MAC layer of the mobile station apparatus has a function of controlling the PHY layer in order to perform the activation or deactivation of the cells, and a function of controlling the PHY layer in order to manage the transmission timing of the uplink.

Figure 9:
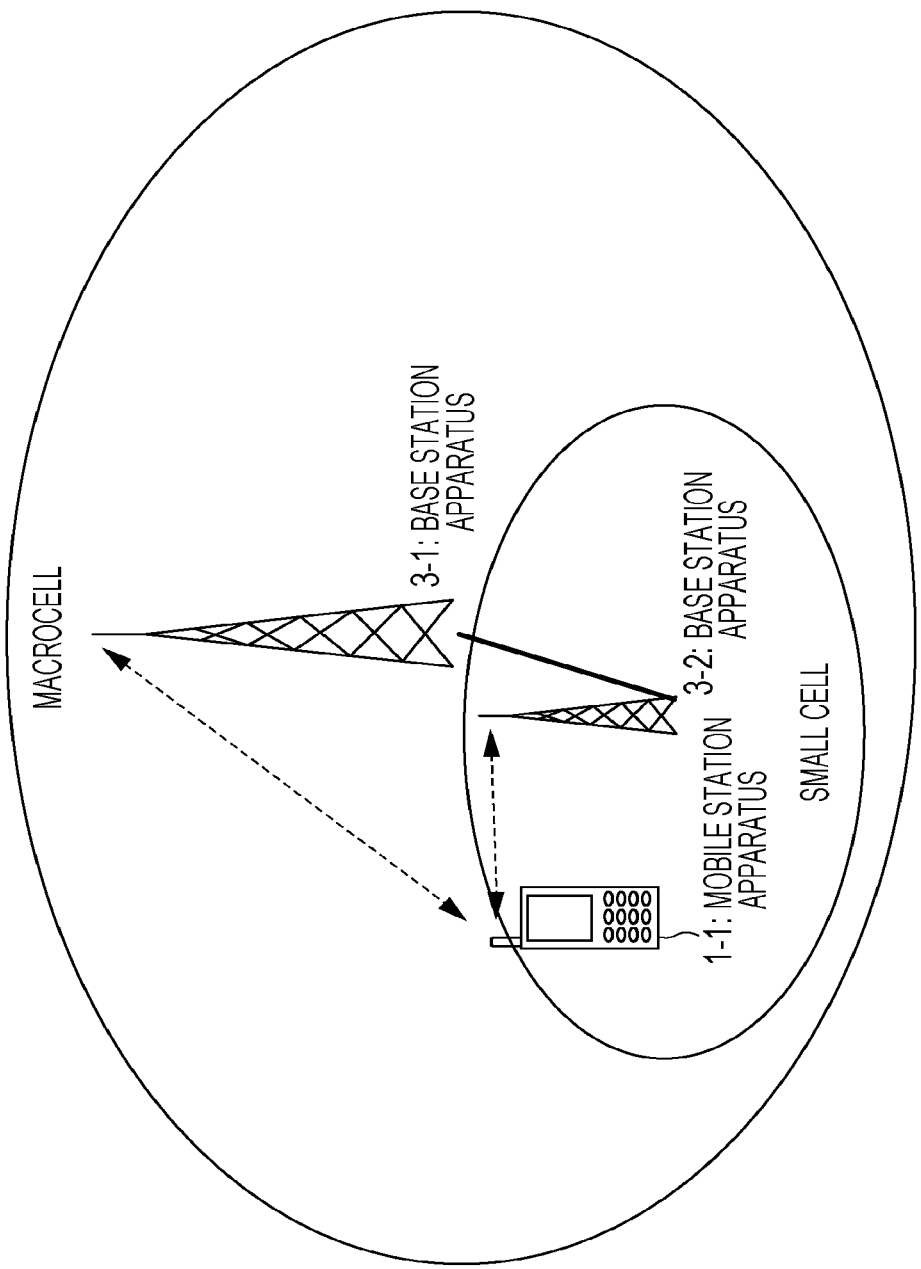
FIG. 9 is an explanatory diagram of an example of dual connect.

It has been examined that, as dual connect with two base station apparatuses, the mobile station apparatus simultaneously communicates with both the base station apparatuses as shown in FIG. 9. The dual connect assumes that the mobile station apparatus is connected to the base station apparatus as the macrocell and the base station apparatus as the small cell and the mobile station apparatus and both the base station apparatuses perform the transmission and reception of data through the plurality of cells in a case where the base station apparatus as the macrocell and the base station apparatus as the small cell are connected using not a high-speed backbone line (referred to as backhaul) such as an optical fiber regarded as having no delay but a low-speed backbone line having delay (NPL 2).

Similarily to the carrier aggregation, in the dual connect, it is preferable that the communication is performed between the mobile station apparatus and the base station apparatus by using the macrocell as the first cell (PCell) and the small cell as the second cell (SCell). However, the dual connect may be configured irrespective of the type (macrocell or small cell) of the cell of the base station apparatus. In the dual connect, it is assumed that the transmission and reception of control data (control information) are performed between the base station apparatus as the macrocell and the mobile station apparatus and the transmission and reception of user data (user information) are performed between the base station apparatus as the small cell and the mobile station apparatus.

The base station apparatus that transmits and receives data may be changed based on the type of data (for example, QoS or logical channel) in addition to the classifications such as the control data and the user data. For example, it is considered that data items on the same data radio bearer are transmitted to the mobile station apparatus from different base station apparatuses of the base station apparatus as the macrocell and the base station apparatus as the small cell and data items on the same data radio bearer is transmitted to different base station apparatuses of the base station as the macrocell and the base station apparatus as the small cell from the mobile station apparatus.

Figure 10:
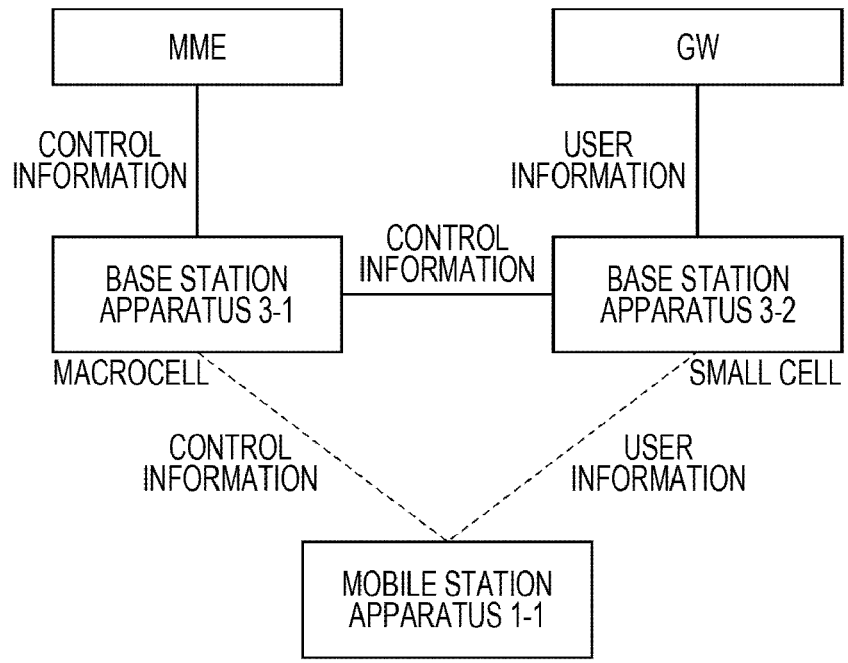
FIG. 10 is an explanatory diagram of the example of the dual connect.

In the dual connect shown in FIG. 10, control information (control-plane information) of at least the mobile station apparatus 1-1 is transmitted and received between the base station apparatus 3-1 as the macrocell and the Mobility Management Entity (MME). User information (User-plane information) of at least mobile station apparatus 1-1 is transmitted and received between the base station apparatus 3-2 as the small cell and the gateway (GW). Control information for controlling the mobile station apparatus 1-1 is transmitted and received between the base station apparatus 3-1 as the macrocell and the base station apparatus 3-2 as the small cell.

At least control information is transmitted and received between the base station apparatus 3-1 as the macrocell and the mobile station apparatus 1-1. User information is transmitted and received between the base station apparatus 3-2 as the small cell and the mobile station apparatus 1-1. User information is transmitted and received between the base station apparatus 3-1 as the macrocell and the mobile station apparatus 1-1 in some cases.

Figure 11:
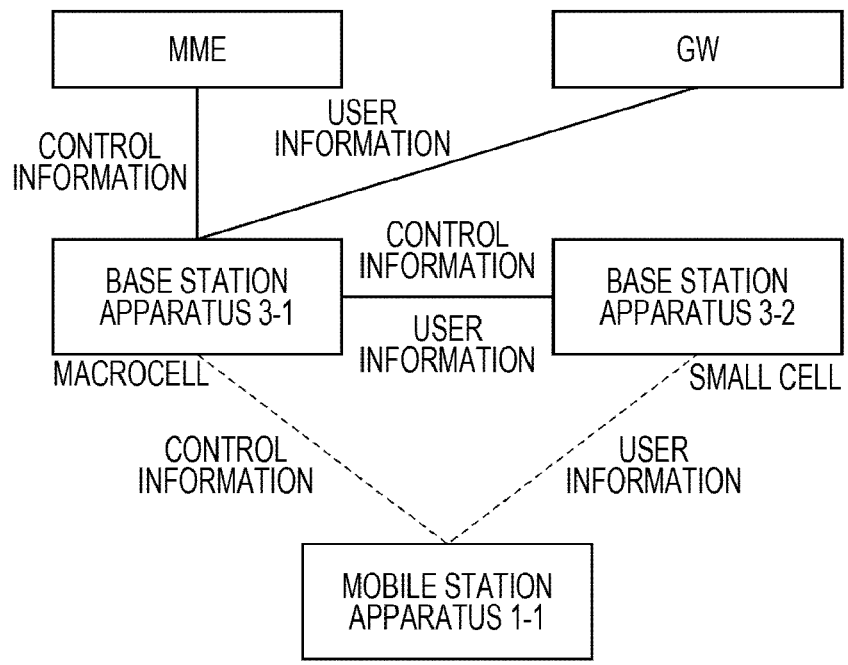
FIG. 11 is an explanatory diagram of the example of the dual connect.

In the dual connect shown in FIG. 11, control information (control-plane information) of at least mobile station apparatus 1-1 is transmitted and received between the base station apparatus 3-1 as the macrocell and the Mobility Management Entity (MME). User information (user-plane information) of at least mobile station apparatus 1-1 is transmitted and received between the base station apparatus 3-1 as the macrocell and the gateway (GW).

The base station apparatus 3-1 as the macrocell transports the user information received from the GW to the base station apparatus 3-2 as the small cell. The base station apparatus 3-2 as the small cell transports the user information received from the mobile station apparatus 1-1 to the base station apparatus 3-1. Control information for controlling the mobile station apparatus 1-1 is transmitted and received between the base station apparatus 3-1 as the macrocell and the base station apparatus 3-2 as the small cell.

Control information or user information is transmitted and received between the base station apparatus 3-1 as the macrocell and the mobile station apparatus 1-1. User information is transmitted and received between the base station apparatus 3-2 as the small cell and the mobile station apparatus 1-1. In the dual connect of the structure of FIG. 4, bearer split in which the mobile station apparatus and both the base station apparatuses transmit and receive information items on the same radio bearer (RB) through both the cells of the macrocell and the small cell is performed.

In a case where one or both of a reception timing for each downlink component carrier in the mobile station apparatus and a transmission timing for each uplink component carrier to the base station apparatus are different for each cell due to the arrangement relationship between the base station apparatuses, cells in which the uplink transmission timings are the same are grouped, and the communication is performed. The cells in which the transmission timings are the same being grouped is referred to as a transmission timing group (timing advance group). The MAC layer of the mobile station apparatus has a function of controlling the PHY layer in order to manage the transmission timing group.

Embodiment

[Structure Description]

Figure 1:
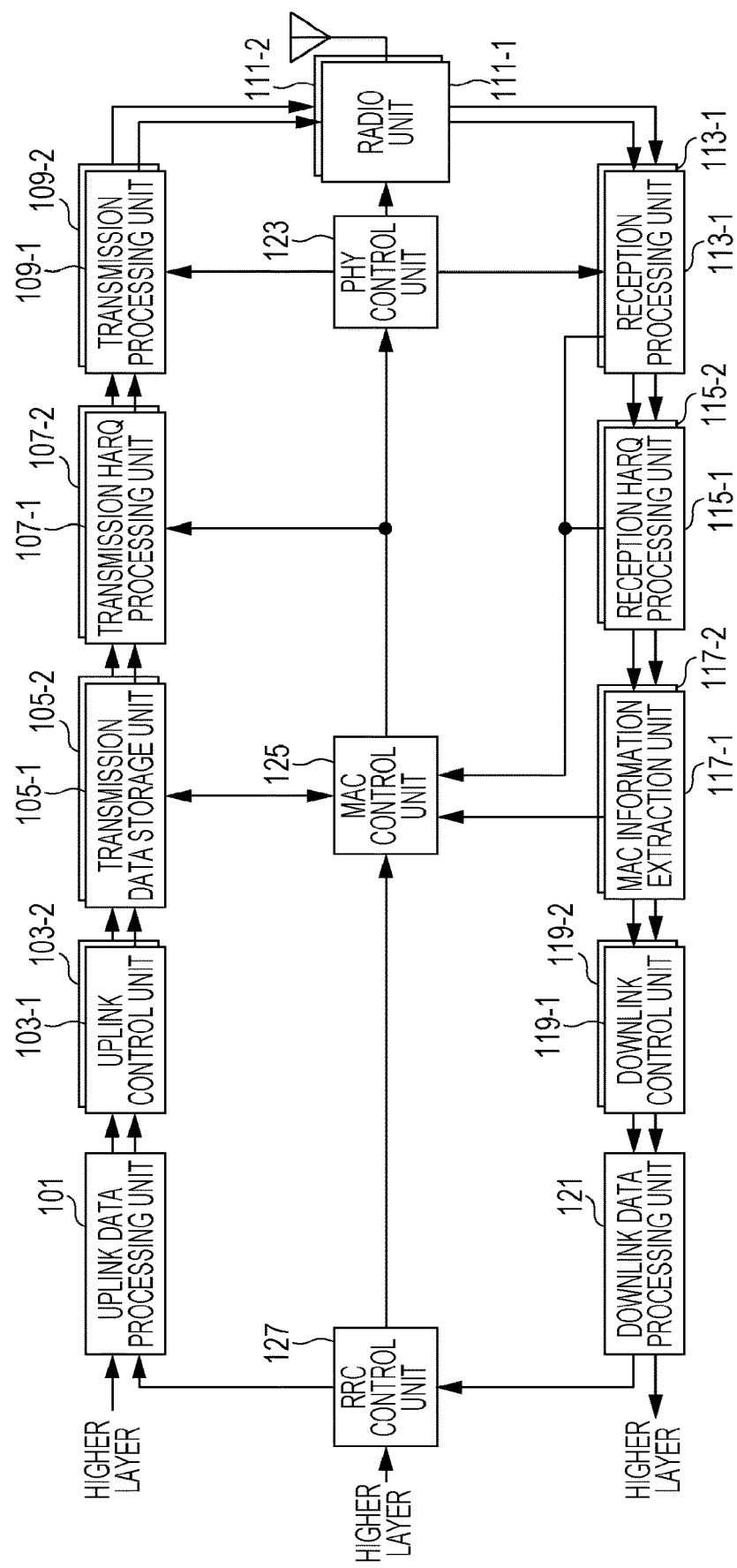
FIG. 1 is a diagram showing an example of a structure of a mobile station apparatus according to an embodiment of the present invention.

FIG. 1 is a diagram showing the structure of the mobile station apparatus according to an embodiment of the present invention. Each of the mobile station apparatuses 1-1 to 1-3 includes an uplink data processing unit 101, an uplink control unit 103-1, an uplink control unit 103-2, a transmission data storage unit 105-1, a transmission data storage unit 105-2, a transmission HARQ processing unit 107-1, a transmission HARQ processing unit 107-2, a transmission processing unit 109-1, a transmission processing unit 109-2, a radio unit 111-1, a radio unit 111-2, a reception processing unit 113-1, a reception processing unit 113-2, a reception HARQ processing unit 115-1, a reception HARQ processing unit 115-2, a MAC information extraction unit 117-1, a MAC information extraction unit 117-2, a downlink control unit 119-1, a downlink control unit 119-2, a downlink data processing unit 121-1, a downlink data processing unit 121-2, a PHY control unit 123, a MAC control unit 125, and an RRC control unit 127.

The user data from the higher layer and the control data from the RRC control unit 127 are input to the uplink data processing unit 101. The uplink data processing unit 101 has a function of the PDCP layer. The uplink data processing unit 101 performs processes such as the header compression of the IP packet of the user data, the ciphering of data and the data segmentation and concatenation, and adjusts the data size. The uplink data processing unit 101 outputs the processed data to the uplink control unit 103-1 or the uplink control unit 103-2.

The uplink data processing unit 101 may output the data to the uplink control unit 103-1 or the uplink control unit 103-2 in response to the instruction from the base station apparatus 3-1. The uplink data processing unit 101 may output the data to the uplink control unit 103-1 or the uplink control unit 103-2 in consideration of the amount of data accumulated in the transmission data storage unit 105-1 and the transmission data storage unit 105-2 or the downlink radio channel quality information.

The uplink control unit 103-1 or the uplink control unit 103-2 has a function of the RLC layer. The uplink control unit 103-1 or the uplink control unit 103-2 performs the processes such as the data segmentation and concatenation on the data input from the uplink data processing unit 101, and adjusts the data size. The uplink control unit 103-1 or the uplink control unit 103-2 performs retransmission control on specific data. The uplink control unit 103-1 or the uplink control unit 103-2 outputs the processed data to the transmission data storage unit 105-1 or the transmission data storage unit 105-2.

The transmission data storage unit 105-1 accumulates (buffers) the data of each logical channel input from the uplink control unit 103-1, and outputs the instructed data corresponding to the instructed data amount to the transmission HARQ processing unit 107-1 based on the instruction from the MAC control unit 125. The transmission data storage unit 105-1 outputs information of the data amount of accumulated data to the MAC control unit 125 based on the instruction from the MAC control unit 125.

In a case where data of the logical channel is newly input from the uplink control unit 103-1 in a state in which there is no data of the logical channel, the transmission data storage unit 105-1 notifies the MAC control unit 125 that new data is generated. In a case where data of the logical channel having a priority higher than that of the accumulated data of the logical channel is input from the uplink control unit 103-1, the transmission data storage unit 105-1 notifies the MAC control unit 125 that data having a high priority is generated. Similarly to the transmission data storage unit 105-1, the transmission data storage unit 105-2 processes the data input from the uplink control unit 103-2.

The transmission HARQ processing unit 107-1 ciphers the data input from the transmission data storage unit 105-1, and performs a puncturing process on the ciphered data. The transmission HARQ processing unit 107-1 outputs the punctured data to the transmission processing unit 109-1, and stores the ciphered data. In a case where the instruction to retransmit the data is received from the MAC control unit 125, the transmission HARQ processing unit 107-1 performs a puncturing process different from the previously performed puncturing process on the stored ciphered data, and outputs the punctured data to the transmission processing unit 109-1. Similarly to the transmission HARQ processing unit 107-1, the transmission HARQ processing unit 107-2 processes the data input from the transmission data storage unit 105-2, and outputs the processed data to the transmission processing unit 109-2.

The transmission processing unit 109-1 modulates and ciphers the data input from the transmission HARQ processing unit 107-1. The transmission processing unit 109-1 performs the discrete Fourier transform (DFT)-inverse fast Fourier transform (IFFT) on the modulated and ciphered data, inserts cyclic prefix (CP) into the processed data, disposes the data into which the CP has been inserted on the physical uplink shared channel (PUSCH) of each component carrier (or cell) of the uplink, and outputs the data to the radio unit 111-1.

In a case where the instruction to respond the reception data is received from the PHY control unit 123, the transmission processing unit 109-1 generates an ACK or NACK signal, disposes the generated signal on the physical uplink control channel (PUCCH) of each component carrier (or cell) of the uplink, and outputs the signal to the radio unit 111-1. In a case where the instruction to transmit the scheduling request is received from the PHY control unit 123, the transmission processing unit 109-1 generates the scheduling request, disposes the generated signal on the physical uplink control channel (PUCCH) of each component carrier (or cell) of the uplink, and outputs the signal to the radio unit 111-1.

In a case where the instruction to transmit the random access preamble is received from the PHY control unit 123, the transmission processing unit 109-1 generates the random access preamble, disposes the generated signal on the physical random access channel (PRACH), and outputs the signal to the radio unit 111-1. Similarly to the transmission processing unit 109-1, the transmission processing unit 109-2 processes the data input from the transmission HARQ processing unit 107-2, and outputs the processed data to the radio unit 111-2.

The radio unit 111-1 performs up-conversion on the data input from the transmission processing unit 109-1 such that the data has a radio frequency of transmission positional information (transmission cell information) as instructed from the PHY control unit 123, adjusts transmit power, and transmits the data from the transmit antenna. The radio unit 111-1 performs down-conversion on a radio signal received by a receive antenna, and outputs the signal to the reception processing unit 113-1.

Similarly, the radio unit 111-2 performs up-conversion on the data input from the transmission processing unit 109-2 such that the data has a radio frequency of transmission positional information (transmission cell information) as instructed from the PHY control unit 123, adjusts transmit power, and transmits the data from a transmit antenna. The radio unit 111-2 performs down-conversion on the radio signal received by the reception signal, and outputs the signal to the reception processing unit 113-2. The frequencies controlled by the radio unit 111-1 and the radio unit 111-2 may belong to the same frequency band, or may belong to different frequency bands.

The reception processing unit 113-1 performs a fast Fourier transform (FFT) process, a deciphering process, and a demodulation process on the signal input from the radio unit 111-1. The reception processing unit 113-1 outputs the data of the physical downlink shared channel (PDSCH) of the demodulated data to the reception HARQ processing unit 115-1. The reception processing unit 113-1 outputs the response information (ACK or NACK) of the uplink transmission data of the control data acquired from the physical downlink control channel PDCCH of the demodulated data and the uplink transmission permission information (uplink grant) to the MAC control unit 125.

The uplink transmission permission information includes the transmission positional information of the uplink radio resource (physical uplink shared channel), data modulation and coding schemes, data size information and HARQ information. The reception processing unit 113-1 measures the downlink reference signal, and measures the downlink radio channel quality between the base station apparatus 3-1 and the mobile station apparatus 1-1. Similarly to the reception processing unit 113-1, the reception processing unit 113-2 processes the data input from the radio unit 111-2, and outputs the processes data to the reception HARQ processing unit 115-2.

The reception HARQ processing unit 115-1 performs the deciphering process on the data input from the reception processing unit 113-1, and outputs the data to the MAC information extraction unit 117-1 in a case where the deciphering process has succeeded. In a case where the deciphering process on the input data has failed, the reception HARQ processing unit 115-1 stores the data on which the deciphering process has failed. In a case where the retransmission data is received, the reception HARQ processing unit 115-1 combines the stored data with the retransmission data, and performs the deciphering process on the combined data.

The reception HARQ processing unit 115-1 notifies the MAC control unit 125 of whether or not the deciphering process on the input data has succeeded. Similarly to the reception HARQ processing unit 115-1, the reception HARQ processing unit 115-2 processes the data input from the reception processing unit 113-2, and outputs the processed data to the MAC information extraction unit 117-2.

The MAC information extraction unit 117-1 extracts the control data of the medium access control layer (MAC layer) from the data input from the reception HARQ processing unit 115-1, and outputs the extracted control information to the MAC control unit 125. The MAC information extraction unit 117-1 outputs the remaining data to the downlink control unit 119-1. Similarly to the MAC information extraction unit 117-1, the MAC information extraction unit 117-2 processes the data input from the reception HARQ processing unit 115-2, and outputs the processed data to the downlink control unit 119-2.

The downlink control unit 119-1 has the function of the RLC layer, and performs the processes such as the segmentation and concatenation on the data input from the MAC information extraction unit 117-1. The downlink control unit 119-1 outputs the processed data to the downlink data processing unit 121. Similarily to the downlink control unit 119-1, the downlink control unit 119-2 processes the data input from the MAC information extraction unit 117-1, and outputs the processed data to the downlink data processing unit 121.

The downlink data processing unit 121 has the function of the PDCP layer, has a function of decompressing (restoring) the compressed IP header and a function of deciphering the ciphered data, and performs the processes such as the data segmentation and concatenation. The downlink data processing unit 121 separates the data into an RRC message and user data, outputs the RRC message to the RRC control unit 127, and outputs the user data to the higher layer.

The PHY control unit 123 controls the transmission processing unit 109-1, the transmission processing unit 109-2, the radio unit 111-1, the radio unit 111-2, the reception processing unit 113-1 and the reception processing unit 113-2 in response to the instruction from the MAC control unit 125. The PHY control unit 123 notifies the transmission processing unit 109-1 or the transmission processing unit 109-2 of the modulation and ciphering schemes and the transmission position from the modulation and ciphering schemes, the transmit power information and the transmission positional information (transmission cell information) notified from the MAC control unit 125, and notifies the radio unit 111-1 or the radio unit 111-2 of frequency information and transmit power information of a transmission cell.

The MAC control unit 125 determines a data transmission destination and a data transmission priority level based on data control configuration designated from the RRC control unit 127, data amount information acquired from the transmission data storage unit 105-1 or the transmission data storage unit 105-2, and uplink transmission permission information acquired from the reception processing unit 113-1 or the reception processing unit 113-2, and notifies the transmission data storage unit 105-1 or the transmission data storage unit 105-2 of information regarding data to be transmitted. The MAC control unit 125 notifies the transmission HARQ processing unit 107-1 or the transmission HARQ processing unit 107-2 of the HARQ information, and outputs the modulation and ciphering schemes and the transmission positional information to the PHY control unit 123.

If a change in an accumulated state of the data from the transmission data storage unit 103-1 or the transmission data storage unit 103-2 is notified, the MAC control unit 125 triggers the buffer status report. In a case where the uplink transmission permission information is acquired from the reception processing unit 113-1 or the reception processing unit 113-2 in a state in which the buffer status report is triggered, the MAC control unit 125 instructs the transmission data storage unit 103 to report the data accumulation amount of each logical channel.

If the data accumulation amount of each logical channel is acquired from the transmission data storage unit 105-1 or the transmission data storage unit 105-2, the MAC control unit 125 generates the buffer status report, and outputs the generated buffer status report to the transmission data storage unit 105-1 or the transmission data storage unit 105-2.

In a case where the uplink transmission permission information is not acquired in a state in which the buffer status report is triggered, the MAC control unit 125 determines to transmit the scheduling request, and instructs the PHY control unit 123 to transmit the scheduling request. In a case where the uplink transmission permission information corresponding to the scheduling request is acquired, the MAC control unit 125 generates the buffer status report, and outputs the generated buffer status report to the transmission data storage unit 105-1 or the transmission data storage unit 105-2.

The MAC control unit 125 counts the transmission number of times of the scheduling request, and instructs the PHY control unit 123 to transmit the random access preamble in a case where the uplink transmission permission information is not acquired even though the transmission number of times of the scheduling request reaches the maximum transmission number of times. The MAC control unit 125 notifies the RRC control unit 127 that the uplink radio resource assigned to the mobile station apparatus is released.

The MAC control unit 125 acquires the response information to the uplink transmission data from the reception processing unit 113-1 or the reception processing unit 113-2, and instructs the transmission HARQ processing unit 107-1 or the transmission HARQ processing unit 107-2 and the PHY control unit 123 to retransmit the uplink transmission data in a case where the response information indicates the NACK (negative response). In a case where information regarding whether or not the deciphering process on the data has succeeded is acquired from the reception HARQ processing unit 115-1 or the reception HARQ processing unit 115-2, the MAC control unit 125 instructs the PHY control unit 123 to transmit the ACK or NACK signal.

The MAC control unit 125 has the function of the MAC layer, and instructs the PHY control unit 123 to control the radio unit 111-1 or the radio unit 111-2, the transmission processing unit 109-1 or the transmission processing unit 109-2, and the reception processing unit 113-1 or the reception processing unit 113-2 in order to control the activation or deactivation and the DRX in a case where discontinuous reception (DRX) control information and activation or deactivation instruction information of the cell (or the component carrier) of MAC control information input from the MAC information extraction unit 117-1 or the MAC information extraction unit 117-2 is acquired.

The MAC control unit 125 manages the validation and invalidation of the transmission timing of the uplink by using a transmission timing timer. The MAC control unit 125 includes the transmission timing timer for each cell or each transmission timing group, and starts or restarts the transmission timing timer corresponding to a case where the transmission timing information is applied to each cell or each transmission timing group. In a case where the transmission timing timer expires, the MAC control unit 125 stops transmitting the uplink to the cell of which the transmission timing timer expires.

The MAC control unit 125 outputs the transmission timing information of the MAC control information input from the MAC information extraction unit 117-1 or the MAC information extraction unit 117-2 to the PHY control unit 123. The MAC control unit 125 manages the uplink transmission timing, and controls the PHY control unit 123.

The RRC control unit 127 performs various configurations for communicating with the base station apparatus 3-1 or the base station apparatus 3-2, such as RRC connection and disconnection processes with and from the base station apparatus 3-1, configuration of the carrier aggregation, and data control configurations of the control data and user data. The RRC control unit 127 performs information exchange with the higher layer according to various configurations, and controls the lower layer according to various configurations. The RRC control unit 127 manages the radio resource of each cell assigned from the base station apparatus 3-1.

The RRC control unit 127 generates the RRC message, and outputs the generated RRC message to the uplink data processing unit 101. The RRC control unit 127 analyzes the RRC message input from the downlink data processing unit 121. The RRC control unit 127 outputs information necessary for the MAC layer to the MAC control unit 125, and outputs information necessary for the physical layer to the PHY control unit 123.

In a case where data control configuration information such as the logical channel of each data, the priority of the logical channel of each data, information indicating the relationship between the logical channel group and the logical channel of each control data and relationship information between the base station apparatus (or the cell or the cell group) and the logical channel is acquired, the RRC control unit 127 outputs the data transmission control configuration information to the MAC control unit 125. In a case where it is recognized that the communication in the dual connect between the base station apparatus 3-1 and the base station apparatus 3-2 is performed, the RRC control unit 127 notifies the MAC control unit 125 that these base station apparatuses are in the dual connect state.

In a case where the releasing of the uplink radio resource is notified from the MAC layer, the RRC control unit 127 releases such as the radio resource of the uplink such as the physical uplink control channel PUCCH and the uplink reference signal assigned to a target cell.

The transmission processing unit 109-1, the transmission processing unit 109-2, the radio unit 111-1, the radio unit 111-2, the reception processing unit 113-1, the reception processing unit 113-2 and the PHY control unit 123 perform the operation of the physical layer. The transmission data storage unit 105-1, the transmission data storage unit 105-2, the transmission HARQ processing unit 107-1, the transmission HARQ processing unit 107-2, the reception HARQ processing unit 115-1, the reception HARQ processing unit 115-2, the MAC information extraction unit 117-1, the MAC information extraction unit 117-2 and the MAC control unit 125 perform the operation of the MAC layer.

The uplink control unit 103-1, the uplink control unit 103-2, the downlink control unit 119-1 and the downlink control unit 119-2 perform the operation of the RLC layer. The uplink data processing unit 101 and the downlink data processing unit 121 perform the operation of the PDCP layer, and the RRC control unit 127 performs the operation of the RRC layer.

The uplink control unit 103-1, the transmission data storage unit 105-1, the transmission HARQ processing unit 107-1, the transmission processing unit 109-1 and the radio unit 111-1 perform a transmission operation to the base station apparatus 3-1, and the uplink control unit 103-2, the transmission data storage unit 105-2, the transmission HARQ processing unit 107-2, the transmission processing unit 109-2 and the radio unit 111-2 perform the transmission operation to the base station apparatus 3-1.

The downlink control unit 119-1, the MAC information extraction unit 117-1, the reception HARQ processing unit 115-1, the reception processing unit 113-1 and the radio unit 111-1 performs a reception operation from the base station apparatus 3-1, and the downlink control unit 119-2, the MAC information extraction unit 117-2, the reception HARQ processing unit 115-2, the reception processing unit 113-2 and the radio unit 111-2 perform the reception operation from the base station apparatus 3-2.

Figure 2:
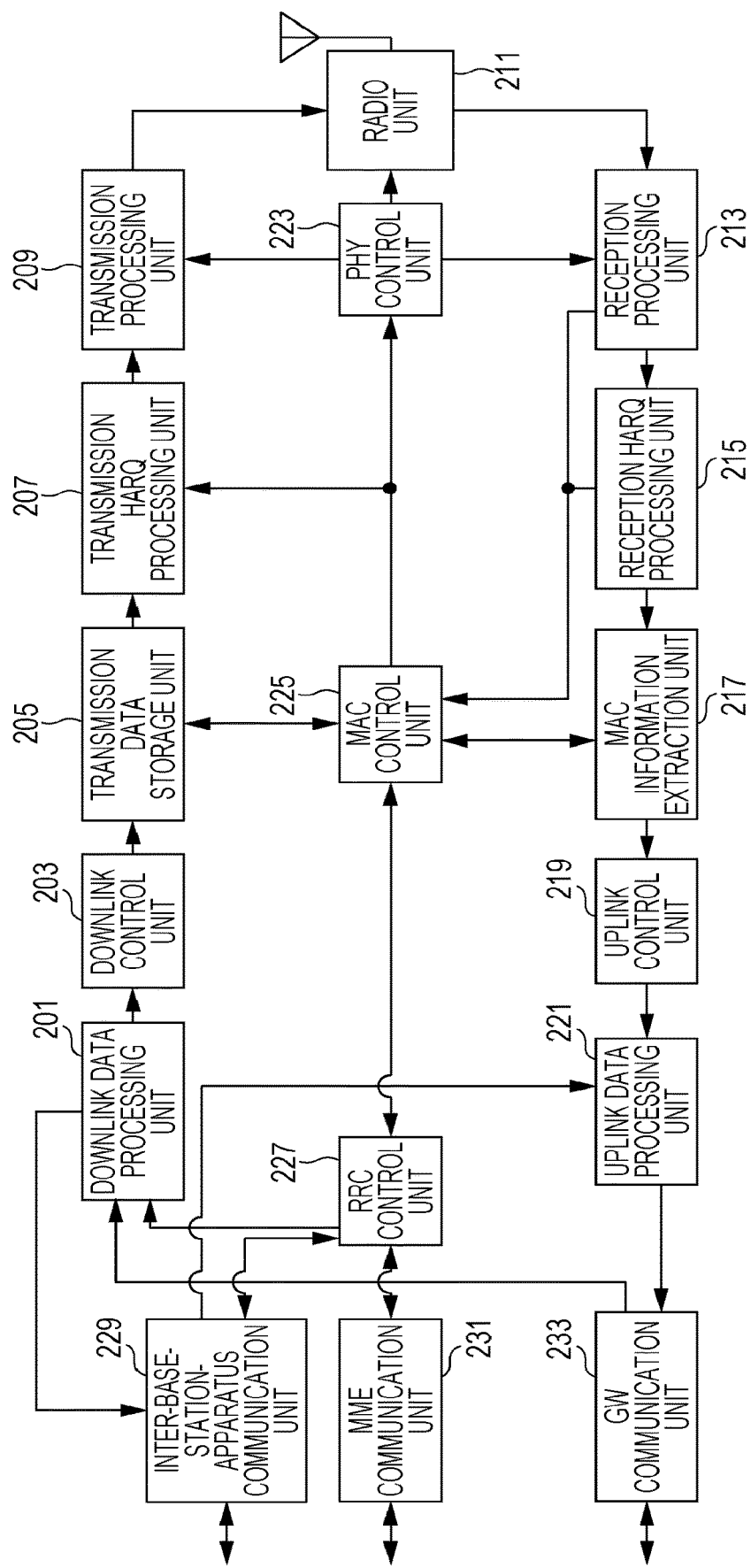
FIG. 2 is a diagram showing an example of a structure of a base station apparatus according to the embodiment of the present invention.

FIG. 2 is a diagram showing the structure of the base station apparatus according to the embodiment of the present invention. The base station apparatus 3-1 includes a downlink data processing unit 201, a downlink control unit 203, a transmission data storage unit 205, a transmission HARQ processing unit 207, a transmission processing unit 209, a radio unit 211, a reception processing unit 213, a reception HARQ processing unit 215, a MAC information extraction unit 217, an uplink control unit 219, an uplink data processing unit 221, a PHY control unit 223, a MAC control unit 225, an RRC control unit 227, an inter-base-station-apparatus communication unit 229, a MME communication unit 231, and a GW communication unit 233.

The user data from the GW communication unit 233 and the control data from the RRC control 227 are input to the downlink data processing unit 201. The downlink data processing unit 201 has the function of the PDCP layer. The downlink data processing unit 201 performs processes such as the header compression of the IP packet of the user data, the ciphering of data, and the data segmentation and concatenation, and adjusts the data size. The downlink data processing unit 201 outputs the processed data to the downlink control unit 203 or the inter-base-station-apparatus communication unit 229.

The downlink data processing unit 201 outputs the data to the downlink control unit 203 or the inter-base-station-apparatus communication unit 229 in consideration of at least one of downlink radio channel quality information, the data amount of the downlink data to the mobile station apparatus 1-1, the transmission data amount (traffic amount) of the base station apparatus 3-1 or the base station apparatus 3-2 to all the mobile station apparatuses.

The downlink control unit 203 has the function of the RLC layer. The downlink control unit 203 performs the processes such as the data segmentation and concatenation on the data input from the downlink data processing unit 201, and adjusts the data size. The downlink control unit 203 performs retransmission control on specific data. The downlink control unit 203 outputs the processed data to the transmission data storage unit 205.

The transmission data storage unit 205 accumulates the data input from the downlink control unit 203 for each user, and outputs the instructed user data corresponding to the instructed data amount to the transmission HARQ processing unit 207 based on the instruction from the MAC control unit 225. The transmission data storage unit 205 outputs information of the data amount of accumulated data to the MAC control unit 225.

The transmission HARQ processing unit 207 ciphers the input data, and performs a puncturing process on the ciphered data. The transmission HARQ processing unit 207 outputs the punctured data to the transmission processing unit 209, and stores the ciphered data. In a case where the instruction to retransmit the data is received from the MAC control unit 225, the transmission HARQ processing unit 207 performs a puncturing process different from the previously performed puncturing process from the stored ciphered data, and outputs the punctured data to the transmission processing unit 209.

The transmission processing unit 209 modulates and ciphers the data input from the transmission HARQ processing unit 207. The transmission processing unit 209 maps the modulated and ciphered data to the signals and the respective channels such as the physical downlink control channel PDCCH of each cell, the downlink synchronization signal, the physical broadcast channel PBCH and the physical downlink shared channel PDSCH, performs OFDM signal processing such as serial or parallel conversion, inverse fast Fourier transform (IFFT) or CP insertion on the mapped data, and generates an OFDM signal.

The transmission processing unit 209 outputs the generated OFDM signal to the radio unit 211. In a case where the instruction to respond the reception data is received from the MAC control unit 225, the transmission processing unit 209 generates the ACK or NACK signal, disposes the generated signal on the physical downlink control channel PDCCH, and outputs the signal to the radio unit 211. The transmission processing unit 209 disposes the uplink transmission permission information notified from the PHY control unit 223 on the physical downlink control channel PDCCH, and outputs the information to the radio unit 211.

The radio unit 211 performs up-conversion on the data input from the transmission processing unit 209 such that the data has a radio frequency, adjusts transmit power, and transmits the data from a transmit antenna. The radio unit 211 performs down-conversion a radio signal received by a receive antenna, and outputs the radio signal to the reception processing unit 213. The reception processing unit 213 performs fast Fourier transform (FFT), deciphering, and demodulation process on the signal input from the radio unit 211.

The reception processing unit 213 outputs the data of the physical uplink shared channel (PUSCH) of the demodulated data to the reception HARQ processing unit 215. The reception processing unit 213 outputs the uplink transmission request information (scheduling request), downlink radio channel quality information (CQI) and the response information (ACK or NACK) of the downlink transmission data of the control data acquired from the physical uplink control channel PUCCH of the demodulated data to the MAC control unit 225. The reception processing unit 213 measures the uplink reference signal, and measures the uplink radio channel quality between the base station apparatus 3-1 and the mobile station apparatus 1-1.

The reception HARQ processing unit 215 performs the deciphering process on the data input from the reception processing unit 213, and outputs the data to the MAC information extraction unit 217 in a case where the deciphering process has succeeded. In a case where the deciphering process on the input data has failed, the reception HARQ processing unit 215 stores the data on which the deciphering process has failed. In a case where the retransmission data is received, the reception HARQ processing unit 215 combines the stored data with the retransmission data, and performs the deciphering process. The reception HARQ processing unit 215 notifies the MAC control unit 225 of whether or not the deciphering process on the input data has succeeded.

The MAC information extraction unit 217 extracts the control data of the MAC layer from the data input from the reception HARQ processing unit 215, and outputs the extracted control data to the MAC control unit 225. The MAC information extraction unit 217 outputs the remaining data to the uplink control unit 219. As the control data of the MAC layer, there is the buffer status report.

The uplink control unit 219 has the function of the RLC layer. The uplink control unit 219 performs the processes such as the data segmentation and concatenation on the data input from the MAC information extraction unit 217, and adjusts the data size. The uplink control unit 219 performs retransmission control on specific data. The uplink control unit 219 outputs the processed data to the uplink data processing unit 221.

The uplink data processing unit 221 has the function of the PDCP layer. The uplink data processing unit 221 has a function of decompressing (restoring) the compressed IP header and a function of deciphering the ciphered data, and performs the processes such as the data segmentation and concatenation. The uplink data processing unit 221 separates the data into the RRC message and the user data, outputs the RRC message to the RRC control unit 227, and outputs the user data to the GW communication unit 233.

The PHY control unit 223 controls the transmission processing unit 209, the radio unit 211 and the reception processing unit 213 in response to the instruction from the MAC control unit 225. The PHY control unit 223 generates the uplink transmission permission information from the scheduling result of the uplink notified from the MAC control unit 225, and notifies the transmission processing unit 209.

The MAC control unit 225 has the function of the MAC layer. The MAC control unit 225 controls the MAC layer based on the information acquired from the RRC control unit 227 or the lower layer. The MAC control unit 225 performs a scheduling process on the data transmitted in the downlink and the uplink. The MAC control unit 225 performs the scheduling process on the downlink data from the response information (ACK or NACK) of the downlink transmission data input from the reception processing unit 213, the downlink radio channel quality information (CQI) and the data amount information for each user acquired from the transmission data storage unit 205. The MAC control unit 225 controls the transmission data storage unit 205, the transmission HARQ processing unit 207 and the transmission processing unit 209 based on the result of the scheduling process.

The MAC control unit 225 performs the scheduling process on the uplink data from the uplink transmission request information (scheduling request) input from the reception processing unit 213 and the buffer status report input from the MAC information extraction unit 217. The MAC control unit 225 notifies the PHY control unit 223 of the result of the scheduling process.

The MAC control unit 225 acquires the response information to the uplink transmission data from the reception processing unit 213, and instructs the transmission HARQ processing unit 207 and the transmission processing unit 209 to retransmit the data in a case where the response information indicates the NACK (negative response). In a case where the information indicating whether or not the deciphering process on the data has succeeded is acquired from the reception HARQ processing unit 215, the MAC control unit 225 instructs the transmission processing unit 209 to transmit the ACK or NACK signal.

The MAC control unit 225 performs the activation or deactivation process on the cell (or the component carrier) assigned to the mobile station apparatus 1-1. The MAC control unit 225 manages the transmission timing group and the uplink transmission timing of each transmission timing group.

The RRC control unit 227 performs various configurations for communicating with the mobile station apparatus 1-1, such as the RRC connection and disconnection process with and from the mobile station apparatus 1-1, configuration of the carrier aggregation, configuration of the dual connect, and data control configuration indicating the cell (or the base station apparatus) in which the user data and the control data of the mobile station apparatus 1-1 are transmitted and received at the time of the dual connect, performs information exchange with the higher layer according to various configurations, and controls the lower layer according to various configurations.

The RRC control unit 227 generates various RRC messages, and outputs the generated RRC message to the downlink data processing unit 201. The RRC control unit 227 analyzes the RRC message input from the uplink data processing unit 221. The RRC control unit 227 outputs information necessary for the MAC layer to the MAC control unit 225, and outputs information necessary for the physical layer to the PHY control unit 223. In a case where the handover or the dual connect is performed, the RRC control unit 227 notifies the inter-base-station-apparatus communication unit 229 and the MME communication unit 231 of necessary information.

The inter-base-station-apparatus communication unit 229 is connected to another base station apparatus (base station apparatus 3-2), and transmits a control message between the base station apparatuses, which is input from the RRC control unit 227, to another base station apparatus. The inter-base-station-apparatus communication unit 229 receives the control message between the base station apparatuses from another base station apparatus, and outputs the received control message to the RRC control unit 227. The control message between the base station apparatuses includes a message related to the handover, a control message related to the connection and disconnection of the dual connect, and a message related to the data control of the mobile station apparatus 1-1.

The inter-base-station-apparatus communication unit 229 transmits the downlink user data of the mobile station apparatus 1-1 to another base station apparatus connected in the dual connect. The inter-base-station-apparatus communication unit 229 receives the uplink user data of the mobile station apparatus 1-1 connected in the dual connect from another base station apparatus, and outputs to the received data uplink data processing unit 221.

The MME communication unit 231 is connected to the Mobility Management Entity (MME), and transmits a control message (S1 message) between the base station apparatus and the MME, which is input from the RRC control unit 227, to the MME. The MME communication unit 231 receives the control message between the base station apparatus and the MME from the MME, and outputs the received control message to the RRC control unit 227. The control message between the base station apparatus and the MME includes a path switch request message, and a path switch request response message.

The inter-GW communication unit 233 is connected to the gateway (GW), receives the user data of the mobile station apparatus 1-1 sent from the GW, and outputs the received data to the downlink data processing unit 201. The inter-GW communication unit 233 transmits the user data of the mobile station apparatus 1-1 input from the uplink data processing unit 221 to the GW.

The transmission processing unit 209, the radio unit 211 and the reception processing unit 213 perform the operation of the PHY layer, the transmission data storage unit 205, the transmission HARQ processing unit 207, the reception HARQ processing unit 215, the MAC information extraction unit 217 and the MAC control unit 225 perform the operation of the MAC layer, the downlink control unit 203 and the uplink control unit 219 perform the operation of the RLC layer, the downlink data processing unit 201 and the uplink data processing unit 221 performs the operation of the PDCP layer, and the RRC control unit 227 performs the operation of the RRC layer.

Figure 3:
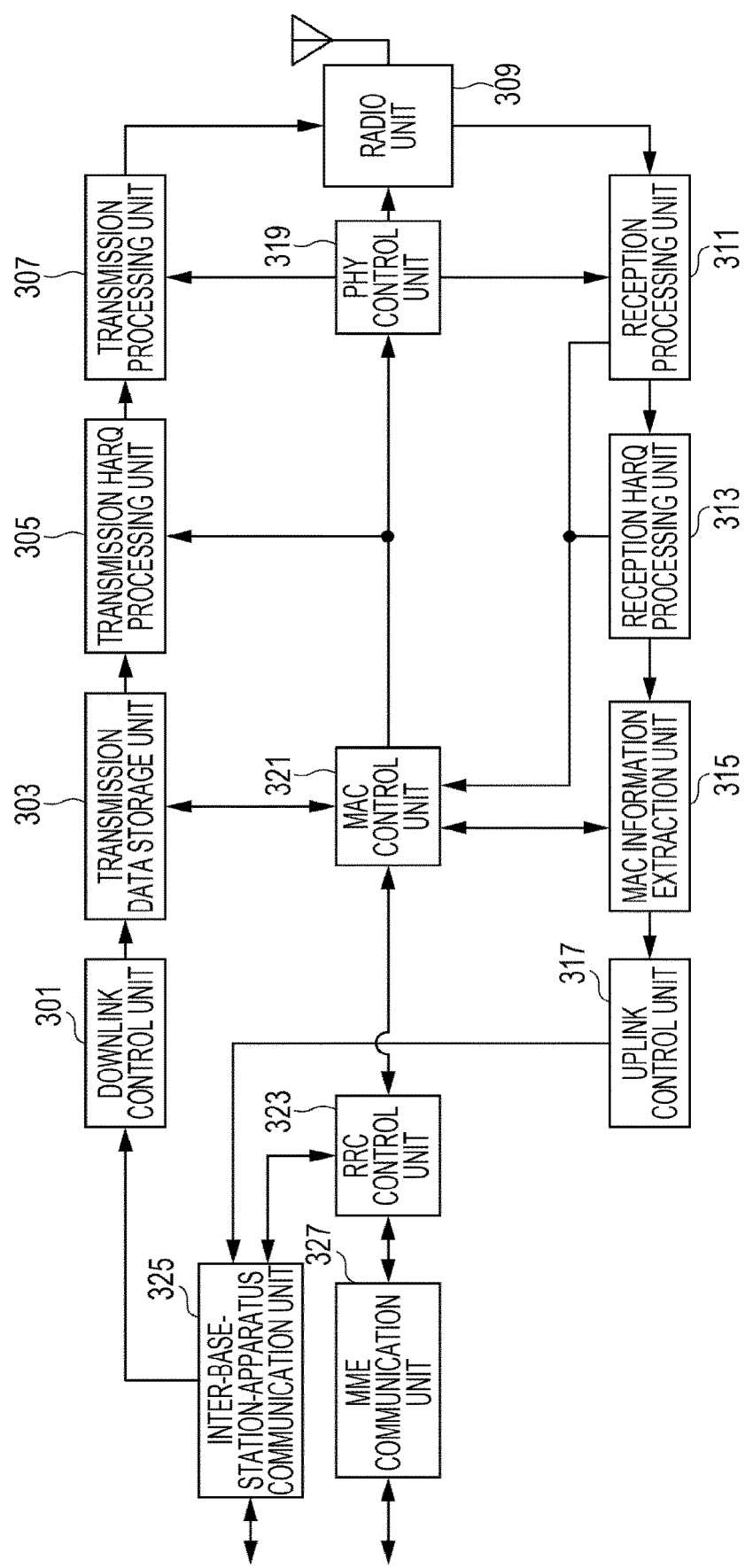
FIG. 3 is a diagram showing an example of the structure of the base station apparatus according to the embodiment of the present invention.

FIG. 3 is a diagram showing the structure of the base station apparatus according to the embodiment of the present invention. The base station apparatus 3-2 includes a downlink control unit 301, a transmission data storage unit 303, a transmission HARQ processing unit 305, a transmission processing unit 307, a radio unit 309, a reception processing unit 311, a reception HARQ processing unit 313, a MAC information extraction unit 315, an uplink control unit 317, a PHY control unit 319, a MAC control unit 321, an RRC control unit 323, an inter-base-station-apparatus communication unit 325, and a MME communication unit 327.

The user data from the inter-base-station-apparatus communication unit 325 is input to the downlink control unit 301. The downlink control unit 301 has the function of the RLC layer, performs the processes such as the data segmentation and concatenation on the data input from the inter-base-station-apparatus communication unit 325, and adjusts the data size. The downlink control unit 301 performs retransmission control on specific data. The downlink control unit 301 outputs the processed data to the transmission data storage unit 303.

The transmission data storage unit 303 accumulates the data input from the downlink control unit 301 for each user, and outputs the instructed user data corresponding to the instructed data amount to the transmission HARQ processing unit 305 based on the instruction from the MAC control unit 321. The transmission data storage unit 303 outputs the information of the data amount of accumulated data to the MAC control unit 321.

The transmission HARQ processing unit 305 ciphers the input data, and performs a puncturing process on the ciphered data. The transmission HARQ processing unit 305 outputs the punctured data to the transmission processing unit 307, and stores the ciphered data. In a case where the instruction to retransmit the data is received from the MAC control unit 321, the transmission HARQ processing unit 305 performs a puncturing process different from the previously performed puncturing process from the stored ciphered data, and outputs the punctured data to the transmission processing unit 307.

The transmission processing unit 307 modulates and ciphers the data input from the transmission HARQ processing unit 305. The transmission processing unit 307 maps the modulated and ciphered data to the signals and the respective channels such as the physical downlink shared channel PDSCH, the physical broadcast channel PBCH, the downlink synchronization signal and the physical downlink control channel PDCCH of each cell, performs the OFDM signal processing such as serial or parallel conversion, inverse fast Fourier transform (IFFT) or CP insertion on the mapped data, and generates the OFDM signal.

The transmission processing unit 307 outputs the generated OFDM signal to the radio unit 309. In a case where the instruction to respond the reception data is received from the MAC control unit 321, the transmission processing unit 307 generates the ACK or NACK signal, disposes the generated signal on the physical downlink control channel PDCCH, and outputs the signal to the radio unit 309. The transmission processing unit 307 disposes the uplink transmission permission information notified from the PHY control unit 319 on the physical downlink control channel PDCCH, and outputs the information to the radio unit 309.

The radio unit 309 performs up-conversion on the input data from the transmission processing unit 307 such that the data has a radio frequency, adjusts transmit power, and transmits the data from the transmit antenna. The radio unit 309 performs down-conversion on the radio signal received from a receive antenna, and outputs the signal to the reception processing unit 311. The reception processing unit 311 performs the fast Fourier transform (FFT) process, deciphering process and demodulation process on the signal input from the radio unit 309.

The reception processing unit 311 outputs the data of the physical uplink shared channel (PUSCH) of the demodulated data to the reception HARQ processing unit 313. The reception processing unit 311 outputs the uplink transmission request information (scheduling request), the downlink radio channel quality information (CQI) and the response information (ACK or NACK) of the downlink transmission data of the control data acquired from the physical uplink control channel PUCCH of the demodulated data to the MAC control unit 321. The reception processing unit 313 measures the uplink reference signal, and measures the uplink radio channel quality between the base station apparatus 3-2 and the mobile station apparatus 1-1.

The reception HARQ processing unit 313 performs the deciphering process on the data input from the reception processing unit 311, and outputs the data to the MAC information extraction unit 315 in a case where the deciphering process has succeeded. In a case where the deciphering process on the input data has failed, the reception HARQ processing unit 313 stores the data on which the deciphering process has failed. In a case where the retransmission data is received, the reception HARQ processing unit 313 combines the stored data with the retransmission data, and performs the deciphering process. The reception HARQ processing unit 313 notifies the MAC control unit 321 of whether or not the deciphering process on the input data has succeeded.

The MAC information extraction unit 315 extracts the control data of the MAC layer form the data input from the reception HARQ processing unit 313, and outputs the extracted control data to the MAC control unit 321. The MAC information extraction unit 315 outputs the remaining data to the uplink control unit 317. The control data of the MAC layer includes the buffer status report.

The uplink control unit 317 has the function of the RLC layer. The uplink control unit 317 performs the processes such as the data segmentation and concatenation on the data input from the MAC information extraction unit 315, and adjusts the data size. The uplink control unit 317 performs retransmission control on specific data. The uplink control unit 317 outputs the processed data to the inter-base-station-apparatus communication unit 325.

The PHY control unit 319 controls the transmission processing unit 307, the radio unit 309 and the reception processing unit 311 in response to the instruction from the MAC control unit 321. The PHY control unit 319 generates the uplink transmission permission information from the scheduling result of the uplink notified from the MAC control unit 321, and notifies the transmission processing unit 307.

The MAC control unit 321 has the function of the MAC layer. The MAC control unit 321 controls the MAC layer based on the information acquired from the RRC control unit 323 or the lower layer. The MAC control unit 321 performs the scheduling process on the data transmitted in the downlink and the uplink. The MAC control unit 321 performs the scheduling process on the downlink data from the response information (ACK or NACK) of the downlink transmission data input from the reception processing unit 311, the downlink radio channel quality information (CQI) and the data amount information for each user acquired from the transmission data storage unit 303. The MAC control unit 321 controls the transmission data storage unit 303, the transmission HARQ processing unit 305 and the transmission processing unit 307 based on the result of the scheduling process.

The MAC control unit 321 performs the scheduling process on the uplink data from the uplink transmission request information (scheduling request) input from the reception processing unit 311 and the buffer status report input from the MAC information extraction unit 315. The MAC control unit 321 notifies the PHY control unit 319 of the result of the scheduling process.

The MAC control unit 321 acquires the response information to the uplink transmission data from the reception processing unit 311, and instructs the transmission HARQ processing unit 305 or the transmission processing unit 307 to retransmit the data in a case where the response information indicates the NACK (negative response). In a case where the information indicating whether or not the deciphering process on the data has succeeded is acquired from the reception HARQ processing unit 313, the MAC control unit 321 instructs the transmission processing unit 307 to transmit the ACK or NACK signal.

The MAC control unit 321 performs the activation or deactivation process of the cell (or the component) assigned to the mobile station apparatus 1-1. The MAC control unit 321 manages the transmission timing group and the uplink transmission timing of each transmission timing group.

The RRC control unit 323 performs various configurations for communicating with the mobile station apparatus 1-1, such as the connection and disconnection with and from the mobile station apparatus 1-1, the configuration of the carrier aggregation and the data control configuration indicating the cell to and from which the control data and the user data of the mobile station apparatus 1-1 are transmitted and received, and performs information exchange with the higher layer according to various configurations, and controls the lower layer according to various configurations.

The RRC control unit 323 generates the control message between the base station apparatuses according to various configurations, and outputs the created control message to the inter-base-station-apparatus communication unit 325. The RRC control unit 323 analyzes the control message between the base station apparatuses from the inter-base-station-apparatus communication unit 325. The RRC control unit 323 outputs information necessary for the MAC layer to the MAC control unit 321, and outputs information necessary for the physical layer to the PHY control unit 319. In a case where the handover or the dual connect is performed, the RRC control unit 323 notifies the inter-base-station-apparatus communication unit 325 and the MME communication unit 327 of necessary information.

The inter-base-station-apparatus communication unit 325 is connected to another base station apparatus (base station apparatus 3-1), and transmits the control message between the base station apparatuses, which is input from the RRC control unit 323, to another base station apparatus. The inter-base-station-apparatus communication unit 325 receives the control message between the base station apparatuses from another base station apparatus, and outputs the received control message to the RRC control unit 323. That is, in the dual connect, various configurations related to a radio link between the base station apparatus 3-3 and the mobile station apparatus 1-1 are notified to the mobile station apparatus 1-1 through the base station apparatus 3-1. The control message between the base station apparatuses include a message related to the handover, a control message related to the connection and disconnection of the dual connect, and a message related to the data control of the mobile station apparatus 1-1.

The inter-base-station-apparatus communication unit 325 transmits the uplink user data of the mobile station apparatus 1-1 connected in the dual connect to another base station apparatus (base station apparatus 3-1). The inter-base-station-apparatus communication unit 325 receives the downlink user data of the mobile station apparatus 1-1 connected in the dual connect from another base station apparatus, and outputs the received data to the downlink control unit 301.

The MME communication unit 327 is connected to the Mobility Management Entity (MME), and transmits the control message between the base station apparatus and the MME, which is input from the RRC control unit 323, to the MME. The MME communication unit 327 receives the control message between the base station apparatus and the MME from the MME, and outputs the received control message to the RRC control unit 323. The control message between the base station apparatus and the MME includes a path switch request message, and a path switch request response message.

The transmission processing unit 307, the radio unit 309, the reception processing unit 311 and the PHY control unit 319 perform the operation of the PHY layer, the transmission data storage unit 303, the transmission HARQ processing unit 305, the reception HARQ processing unit 313, the MAC information extraction unit 315 and the MAC control unit 321 perform the operation of the MAC layer, the downlink control unit 301 and the uplink control unit 317 perform the operation of the RLC layer, and the RRC control unit 323 performs the operation of the RRC layer.

[Operation Description]

The wireless communication system described in FIGS. 4 to 11 is assumed. As shown in FIG. 4, the base station apparatus 3-1 communicates with the plurality of mobile station apparatuses 1-1, 1-2 and 1-3. The wireless communication system described in FIG. 9 in which the base station apparatus 3-1 as the macrocell, the base station apparatus 3-2 as the small cell communicate with the mobile station apparatus 1-1 through the plurality of cells is assumed.

The mobile station apparatus 1-1 shown in FIG. 11 is connected to the base station apparatus 3-1 and the base station apparatus 3-2 in the dual connect. The control information (control data) or the user information (user data) is transmitted and received between the base station apparatus 3-1 as the macrocell and the mobile station apparatus 1-1. The user information is transmitted and received between the base station apparatus 3-2 as the small cell and the mobile station apparatus 1-1.

Hereinafter, the operations of the base station apparatus and the mobile station apparatus will be described in conjunction with the example in which the base station apparatus 3-1 is connected to the mobile station apparatus 1-1 through a cell 1 and the base station apparatus 3-2 is connected to the mobile station apparatus 1-1 through a cell 2. Each base station apparatus may assign the plurality of cells to the mobile station apparatus 1-1. The cell 1 may be set as a transmission timing group 1 (or a cell group 1), and the cell 2 may be set as a transmission timing group 2 (or a cell group 2).

The base station apparatus 3-1 notifies the mobile station apparatus 1-1 of the data control information indicating the relationship between the logical channel of each control data and the logical channel group (LCG), the priority of the logical channel of each control data and the logical channel of each control data, as the configuration information of the radio bearer of each control data. The base station apparatus 3-1 notifies the mobile station apparatus 1-1 of the information related to the transmission and reception cells and the logical channel (or the logical channel group), the information indicating the relationship between the logical channel of each user data and the logical channel group, the priority of the logical channel of each user data, and the logical channel of each user data, as the configuration information of the radio bearer of each user data.

For example, the base station apparatus 3-1 configures logical channel 1 corresponding to control data 1, and configures the logical channel 1 to logical channel group 1. The base station apparatus 3-1 configures logical channel 2 corresponding to control data 2, and configures the logical channel 2 to logical channel group 2. The base station apparatus 3-1 configures logical channel 3 corresponding to user data 1, and configures the logical channel 3 to logical channel group 3. The base station apparatus 3-1 configures logical channel 4 corresponding to user data 2, and configures the logical channel 4 to logical channel group 4.

The base station apparatus 3-1 configures the logical channel such that the data of the logical channel 3 (or the logical channel group 3) is transmitted through the cell 1 (or the base station apparatus 3-1) and the cell 2 (or the base station apparatus 3-2), and configures the logical channel such that the data of the logical channel 4 (or the logical channel group 4) is transmitted through the cell 2 (or the base station apparatus 3-2). It is assumed that the base station apparatus 3-1 configures the logical channel such that the priority of the logical channel 1 is higher than the priority of the logical channel 2 and configures the logical channel such that the priority of the logical channel 3 is higher than the priority of the logical channel 4.

The base station apparatus 3-1 notifies the mobile station apparatus 1-1 of preferential transmission cell (preferential base station apparatus) information indicating the cell (base station apparatus) in which the data is preferentially transmitted, for the data of the logical channel (or the logical channel group) transmitted to both cells of the cell 1 (base station apparatus 3-1) and the cell 2 (base station apparatus 3-2). That is, the base station apparatus 3-1 determines the cell to which the data is preferentially transmitted, for the data to which the bearer split is configured, and notifies the mobile station apparatus 1-1 of the cell to which the data is preferentially transmitted.

For example, the base station apparatus 3-1 notifies the mobile station apparatus 1-1 of information for instructing to preferentially transmit the data of the logical channel 3 (or the logical channel group 3) to the cell 2 (or the base station apparatus 3-2).

If the information is received from the base station apparatus 3-1, the mobile station apparatus 1-1 configures the logical channel such that the data items of the logical channel 1 and the logical channel 2 (or the logical channel group 1 and the logical channel group 2) are transmitted through the cell 1 (or the base station apparatus 3-1), the data of the logical channel 3 (or the logical channel group 3) is transmitted through the cell 1 and the cell 2 (or the base station apparatus 3-1 and the base station apparatus 3-2), and the data of the logical channel 4 (or the logical channel group 4) is transmitted through the cell 2 (or the base station apparatus 3-2).

Since the logical channel is configured such that the data of the logical channel 3 (or the logical channel group 3) is transmitted through the cell 1 and the cell 2 (or the base station apparatus 3-1 and the base station apparatus 3-2), the mobile station apparatus 1-1 recognizes that the bearer split is configured to the data of the logical channel 3. More specifically, in a case where configuration (r1c-Config) related to two or more RLC layers corresponding (linked) to a certain radio bearer and configuration (mac-MainConfig) (or identification information indicating the configuration of the MAC layer corresponding to the configuration of the RLC layer) related to the MAC layer corresponding (linked) to each configuration related to the RLC layer are notified from the base station apparatus 3-1, the mobile station apparatus 1-1 recognizes that the bearer split is configured.

The base station apparatus 3-1 may separately transmit information indicating whether or not the bearer split is performed to each radio bearer (or each logical channel). The mobile station apparatus 1-1 configures (controls) the logical channel such that the data of the logical channel 3 (or the logical channel group 3) is preferentially transmitted to the cell 2. The base station apparatus 3-1 may notify of proportion information of the amount of data transmitted to the respective base station apparatuses of the base station apparatus 3-1 and the base station apparatus 3-2 for the data to which the bearer split is configured.

In a case where the data of the uplink is generated in the mobile station apparatus 1-1, the uplink data processing unit 101 of the mobile station apparatus 1-1 inputs the data to the transmission unit corresponding to the relationship between the logical channel (logical channel group) and the cell (base station apparatus).

For example, in a case where the data of the logical channel 1 is generated, the uplink data processing unit 101 of the mobile station apparatus 1-1 inputs the data to the transmission unit corresponding to the cell 1 (base station apparatus 3-1). That is, in a case where the data of the logical channel 1 is generated, the uplink data processing unit 101 of the mobile station apparatus 1-1 inputs the data to the uplink control unit 103-1. After the data is processed, if the data is accumulated (buffered) in the transmission data storage unit 105-1, the MAC control unit 125 of the mobile station apparatus 1-1 triggers the buffer status report for the cell 1 (base station apparatus 3-1).

In a case where the radio resource (physical uplink shared data channel PUSCH) of the cell 1 is assigned from the base station apparatus 3-1, the mobile station apparatus 1-1 transmits the buffer status report and the data of the logical channel 1 to the base station apparatus 3-1 through the cell 1. The mobile station apparatus receives the uplink transmission permission information of the cell 1 from the base station apparatus 3-1 again, and the mobile station apparatus 1-1 transmits the remaining data to the base station apparatus 3-1 in a case where the radio resource of the cell 1 is assigned. In a case where the radio resource of the cell 1 is not assigned from the base station apparatus 3-1, the mobile station apparatus performs the scheduling request using the physical uplink control channel PUCCH or the scheduling request using the random access procedure.

For example, in a case where the data of the logical channel 3 is generated, since the preferential transmission cell information is the cell 2, the uplink data processing unit 101 of the mobile station apparatus 1-1 inputs the data to the uplink control unit 103-2. After the data is processed, if the data is accumulated (buffered) in the transmission data storage unit 105-2, the MAC control unit 125 of the mobile station apparatus 1-1 triggers the buffer status report for the cell 2 (base station apparatus 3-2).

In a case where the radio resource (physical uplink shared data channel PUSCH) of the cell 2 is assigned from the base station apparatus 3-2, the mobile station apparatus 1-1 transmits the buffer status report and the data of the logical channel 3 to the base station apparatus 3-2 through the cell 2. In a case where the radio resource of the cell 2 is assigned from the base station apparatus 3-2 again, the mobile station apparatus 1-1 transmits the remaining data to the base station apparatus 3-2. In a case where the radio resource of the cell 2 is not assigned from the base station apparatus 3-2, the mobile station apparatus 1-1 performs the scheduling request using the physical uplink control channel PUCCH or the scheduling request using the random access procedure on the base station apparatus 3-2.

In a case where the preferential transmission cell is configured and the data amount of the transmission buffer to the preferential transmission cell is not reduced or the data amount of the transmission buffer exceeds a predetermined threshold, the mobile station apparatus 1-1 may input the data to the transmission unit corresponding to the cell which is not the preferential transmission cell. In a case where the radio resource is not assigned from the base station apparatus as the preferential transmission cell, or in a case where the data amount exceeds the radio resource amount assigned from the base station apparatus and the transmission data is generated in the mobile station apparatus, the mobile station apparatus 1-1 inputs the data to the transmission unit corresponding to the cell which is not the preferential transmission cell.

For example, the data amount of the data of the logical channel 3 exceeds to a predetermined amount of the transmission data storage unit 105-2, the uplink data processing unit 101 of the mobile station apparatus 1-1 inputs the data to the uplink control unit 103-1. The MAC control unit 125 of the mobile station apparatus 1-1 triggers the buffer status report for the cell 1 (base station apparatus 3-1), and also transmits the data to the cell 1.

In a case where the data amount of the data of the logical channel 3 is less than a predetermined amount of the transmission data storage unit 105-2, the uplink data processing unit 101 of the mobile station apparatus 1-1 inputs the data to the uplink control unit 103-2 again. The threshold of the transmission buffer may be notified from the base station apparatus 3-1, or may be previously determined between the base station apparatus 3-1 and the mobile station apparatus 1-1.

The mobile station apparatus 1-1 may determine whether to transmit the data to the base station apparatus 3-1 or the base station apparatus 3-2 in a state of the radio channel quality between the mobile station apparatus and the base station apparatus. The mobile station apparatus 1-1 may determine whether to transmit the data to the base station apparatus 3-1 or the base station apparatus 3-2 in consideration of at least one of the state of the radio channel quality between the mobile station apparatus and the base station apparatus, the state of the mobile station apparatus 1-1 such as the data amount of the transmission buffer and the instruction from the base station apparatus 3-1. The mobile station apparatus 1-1 may determine the base station apparatus as the data transmission destination in consideration of internal information (for example, a transmission speed of data of each bearer) of another mobile station apparatus 1-1.

Although it has been described that the mobile station apparatus 1-1 determines the cell to which the data is transmitted, an example in which the base station apparatus 3-1 or the base station apparatus 3-2 determines the cell (base station apparatus) through which the mobile station apparatus transmits the data and notifies the mobile station apparatus 1-1 of the transmission destination cell information and the mobile station apparatus 1-1 transmits the data based on the transmission destination cell information (base station apparatus information as the transmission destination cell) will be described below.

The base station apparatus 3-1 and the base station apparatus 3-2 determine the cell (base station apparatus) through which the mobile station apparatus 1-1 transmits the data to be subject to the bearer split. For example, the base station apparatus 3-1 and the base station apparatus 3-2 may measure the radio channel quality of the uplink, and may instruct the mobile station apparatus to transmit the data to the cell (base station apparatus) having favorable radio channel quality of the uplink. Alternatively, the base station apparatuses may instruct the mobile station apparatus to transmit the data to the cell (base station apparatus) in which the data amount (traffic amount) of the uplink of each base station apparatus is small.

The base station apparatus 3-1 and the base station apparatus 3-2 may instruct the mobile station apparatus to transmit the data to the cell (base station apparatus) of which the radio channel quality of the uplink is favorable and the data amount (traffic amount) of the uplink of the base station apparatus is small. In an initial stage immediately after the dual connect is configured, the base station apparatus 3-1 or the base station apparatus 3-2 may instruct the mobile station apparatus to transmit the data to any one cell (base station apparatus). For example, immediately after the dual connect is configured, the base station apparatus 3-2 instructs the mobile station apparatus 1-1 to transmit the data to the cell 2 of the base station apparatus 3-2 as the small cell.

In the initial stage immediately after the dual connect is configured, the mobile station apparatus and the base station apparatus may previously determine that the mobile station apparatus transmits the data to any one cell (base station apparatus). For example, immediately after the dual connect is configured, the mobile station apparatus and the base station apparatus may determine that the mobile station apparatus 1-1 transmits the data to the cell 2 of the base station apparatus 3-2 as the small cell.

After the base station apparatus 3-1 and the base station apparatus 3-2 determine the cell (base station apparatus) through which the mobile station apparatus 1-1 transmits the data to be subject to the bearer split, the base station apparatus 3-1 or the base station apparatus 3-2 notifies the mobile station apparatus 1-1 of the message of the MAC layer or the transmission destination cell information as the information of the physical layer. The base station apparatus 3-1 and the base station apparatus 3-2 may instruct the mobile station apparatus to transmit the data to the transmission destination cell for all the data items to be subject to the bearer split, or may instruct the mobile station apparatus to transmit the data to each bearer to be subject to bearer split.

The base station apparatus 3-2 may notify the base station apparatus 3-1 of the uplink radio channel quality (of cell 2) between the base station apparatus 3-2 and the mobile station apparatus 1-1 or the traffic amount of the base station apparatus 3-2, and the base station apparatus 3-1 may compare the notified information with the information of the base station apparatus and may determine the cell through which the mobile station apparatus 1-1 transmits the data. In contrast, the base station apparatus 3-1 may notify the base station apparatus 3-2 of the uplink radio channel quality (of cell 1) between the base station apparatus 3-1 and the mobile station apparatus 1-1 or the traffic amount of the base station apparatus 3-1, and the base station apparatus 3-2 may compare the notified information with the information of the base station apparatus and may determine the cell through which the mobile station apparatus 1-1 transmits the data.

While any one of the base station apparatuses causes the mobile station apparatus 1-1 to transmit the data, in a case where the uplink radio channel quality is degraded, or in a case where the traffic amount of the base station apparatus is increased, the base station apparatus that causes the mobile station apparatus 1-1 to transmit the data may notify the other base station apparatus of the change of the transmission destination cell. The base station apparatus 3-1 may determine the cell through which the mobile station apparatus 1-1 transmits the data in consideration of the communication speed (or transport delay time) between the base station apparatus 3-1 and the base station apparatus 3-2.

For example, while the mobile station apparatus 1-1 transits the data through the cell 2 (base station apparatus 3-2), in a case where the traffic amount of the cell 2 (base station apparatus 3-2) is increased and it is difficult to assign the radio resource (physical uplink shared channel PUSCH) to the mobile station apparatus 1-1, the base station apparatus 3-2 notifies the base station apparatus 3-1 of the change of the transmission destination cell. The base station apparatus 3-1 notifies the mobile station apparatus 1-1 of the transmission destination cell information indicating that the data is transmitted through the cell 1.

In a case where the transmission destination information is received, the mobile station apparatus 1-1 is configured such that the data is transmitted to the cell indicated by the transmission destination cell information. The transmission destination cell information may be transmitted by the MAC message or the RRC message. For example, in a case where the mobile station apparatus 1-1 receives the transmission destination cell information indicating that the data is transmitted through the cell 2, the uplink data processing unit 101 of the mobile station apparatus 1-1 is configured such that the data is output to the uplink control unit 103-2.

In a case where the data of the logical channel 3 is generated, the uplink data processing unit 101 of the mobile station apparatus 1-1 input the data processed by the uplink data processing unit 101 to the uplink control unit 103-2. After the data is processed in the uplink control unit 103-2, if the data is accumulated (buffered) in the transmission data storage unit 105-2, the MAC control unit 125 of the mobile station apparatus 1-1 triggers the buffer status report for the cell 2 (bases station apparatus 3-2).

In a case where the radio resource (physical uplink shared data channel PUSCH) of the cell 2 is assigned from the base station apparatus 3-2, the mobile station apparatus 1-1 transmits the buffer status report and the data of the logical channel 3 to the base station apparatus 3-2 through the cell 2. In a case where the radio resource of the cell 2 is assigned from the base station apparatus 3-2 again, the mobile station apparatus 1-1 transmits the remaining data to the base station apparatus 3-2. In a case where the radio resource of the cell 2 is not assigned from the base station apparatus 3-2, the mobile station apparatus 1-1 performs the scheduling request using the physical uplink control channel PUCCH or the scheduling request using the random access procedure on the base station apparatus 3-2.

In a case where the data amount (traffic amount) of the uplink of the base station apparatus 3-2 or the uplink radio channel quality between the mobile station apparatus 1-1 and the base station apparatus 3-2 is changed and the transmission cell is changed to the cell 1 of the base station apparatus 3-1, the base station apparatus 3-1 notifies the mobile station apparatus 1-1 of the transmission destination cell information indicating that the data is transmitted through the cell 1.

In a case where the transmission cell information indicating that the cell 1 transmits the data is received, the mobile station apparatus 1-1 is configured such that the uplink data processing unit 101 of the mobile station apparatus 1-1 outputs the data to the uplink control unit 103-1. In a case where the data of the logical channel 3 is generated, the uplink data processing unit 101 of the mobile station apparatus 1-1 inputs the data processed by the uplink data processing unit 101 to the uplink control unit 103-1. After the data is processed in the uplink control unit 103-1, if the data is accumulated (buffered) in the transmission data storage unit 105-1, the MAC control unit 125 of the mobile station apparatus 1-1 triggers the buffer status report for the cell 1 (base station apparatus 3-1).

In a case where the radio resource (physical uplink shared data channel PUSCH) of the cell 1 is assigned from the base station apparatus 3-1, the mobile station apparatus 1-1 transmits the buffer status report and the data of the logical channel 3 to the base station apparatus 3-1 through the cell 1. In a case where the radio resource of the cell 1 is assigned from the base station apparatus 3-1 again, the mobile station apparatus 1-1 transmits the remaining data to the base station apparatus 3-1. In a case where the radio resource of the cell 1 is not assigned from the base station apparatus 3-1, the mobile station apparatus 1-1 performs the scheduling request using the physical uplink control channel PUCCH or the scheduling request using the random access procedure on the base station apparatus 3-1.

In a case where the scheduling request is received from the mobile station apparatus 1-1, or in a case where the buffer status report is received from the mobile station apparatus 1-1, the base station apparatus 3-1 and the base station apparatus 3-2 assign the uplink radio resource to the mobile station apparatus 1-1, and notifies the mobile station apparatus 1-1 of the uplink transmission permission information indicating the uplink radio resource assignment through the physical downlink control channel PDCCH.

By doing this, the mobile station apparatus 1-1 can transmit the uplink data or the buffer status report of the mobile station apparatus 1-1 to the appropriate cell (or the base station apparatus). The base station apparatus 3-1 and the base station apparatus 3-2 can cause the mobile station apparatus 1-1 to perform the uplink data transmission control on the appropriate cell (or the base station apparatus).

Although the embodiment of the present invention has been described in detail with reference to the drawings, the detailed structure is not limited to the above-described embodiment, and the present invention also includes various changes in the design without departing from the gist of the present invention.

Although it has been described in the embodiment that an example of the terminal apparatus or the communication apparatus is the mobile station apparatus, the present invention is not limited thereto. The present invention can also be applied to terminal apparatuses or communication apparatuses of stationary or non-movable electronic apparatuses which are installed indoors or outdoors, such as AV apparatuses, kitchen apparatuses, cleaning and washing machines, air conditioners, office apparatuses, vending machines, and other home appliances.

For the sake of convenience in description, the mobile station apparatus 1-1, the base station apparatus 3-1 and the base station apparatus 3-2 of the embodiment have been described with reference to the functional block diagrams. However, the mobile station apparatus or the base station apparatus may be controlled by recording programs for realizing the functions of the respective units of the mobile station apparatus 1-1, the base station apparatus 3-1 and the base station apparatus 3-2 and some of the functions thereof on a computer-readable recording medium and causing a computer system to read and execute the program recorded on the recording medium. The term "computer system" means a computer system that includes an OS or hardware such as peripheral devices.

The term "computer-readable recording medium" means a portable medium, such as a flexible disk, a magneto-optical disk, a ROM, or a CD-ROM, or a storing apparatus such as a hard disc provided in the computer system. The "computer-readable recording medium" may include a recording medium that dynamically stores the program in a short period of time, such as a communication cable used in a case where the program is transmitted through a network, such as the Internet, or a communication line, such as a telephone line, and a recording medium that stores the program for a predetermined period of time, such as a volatile memory in a computer system that serves as a server or a client in this case. The program may be a program that realizes some of the above-mentioned functions or a program that implements the above-mentioned functions in combination with the program which has been recorded on the computer system.

The functional blocks used in the embodiment may be realized as LSIs which are typical integrated circuits. Each functional block may be individually integrated into a chip, or some or all of the functional blocks may be integrated into a chip. A method for achieving the integrated circuit is not limited to the LSI, but may be realized by a dedicated circuit or a general-purpose processor. In addition, in a case where a technique for achieving an integrated circuit which replaces the LSI technique will be developed with the progress of a semiconductor technique, the integrated circuit manufactured by the developed technique can also be used.

The embodiment of the present invention has been described with reference to the drawings. However, the detailed structure is not limited to the above-described embodiment and the present invention also includes a change in the design within the scope and spirit of the invention.

INDUSTRIAL APPLICABILITY

The present invention can be applied to a portable telephone, a personal computer, or a tablet computer and the like.

REFERENCE SIGNS LIST 1-1 to 1-3 Mobile station apparatus
3-1 Base station apparatus as macro cell
3-2 Base station apparatus as small cell
101, 221, 301 Uplink data processing unit
103-1, 103-2, 219, 317 Uplink control unit
105-1, 105-2, 205, 303 Transmission data storage unit
107-1, 107-2, 207, 305 Transmission HARQ processing unit
109-1, 109-2, 209, 307 Transmission processing unit
111-1, 111-2, 211, 309 Radio unit
113-1, 113-2, 213, 311 Reception processing unit
115-1, 115-2, 215, 313 Reception HARQ processing unit
117-1, 117-2, 217, 315 MAC information extraction unit
119-1, 119-2, 203, 301 Downlink control unit
121, 201 Downlink data processing unit
123, 223, 319 PHY control unit
125, 225, 321 MAC control unit
127, 227, 323 RRC control unit
229, 325 Inter-base-station-apparatus communication unit
231, 327 MME communication unit
233 GW Communication unit

The invention claimed is:

1. A terminal apparatus for communicating with a first cell group and a second cell group, the terminal apparatus comprising:
 receiver circuitry configured to receive, from the first cell group, instruction information indicating whether a destination of data transmission of user data is the first cell group or the second cell group; and
 determination circuitry configured to selectively determine, based on the instruction information, the destination of the user data transmission to be:
 (i) the second cell group; or
 (ii) the first cell group
 in a case that bearer split is configured for the user data.

2. An integrated circuit for use in a terminal apparatus configured to communicate with a first cell group and a second cell group, the integrated circuit comprising:
 receiving circuitry configured to receive, from the first cell group, instruction information indicating whether a destination of user data transmission of data is the first cell group or the second cell group; and
 determination circuitry configured to selectively determine, based on the instruction information, the destination of the user data transmission to be:
 (i) the second cell group; or
 (ii) the first cell group
 in a case that bearer split is configured for the user data.

* * * * *